United States Patent
Koponen et al.

(10) Patent No.: US 11,118,914 B2
(45) Date of Patent: Sep. 14, 2021

(54) METHODS AND SYSTEMS FOR MAP MATCHING

(71) Applicant: TomTom Navigation B.V., Amsterdam (NL)

(72) Inventors: Lauri Koponen, Amsterdam (NL); Rui Sun, Amsterdam (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 110 days.

(21) Appl. No.: 16/318,853

(22) PCT Filed: Jul. 28, 2017

(86) PCT No.: PCT/EP2017/069139
§ 371 (c)(1),
(2) Date: Jan. 18, 2019

(87) PCT Pub. No.: WO2018/019984
PCT Pub. Date: Feb. 1, 2018

(65) Prior Publication Data
US 2019/0186926 A1    Jun. 20, 2019

(30) Foreign Application Priority Data

Jul. 29, 2016 (GB) .................................... 1613105
Oct. 13, 2016 (GB) .................................... 1617407

(51) Int. Cl.
*G01C 21/30* (2006.01)
*G01C 21/32* (2006.01)

(52) U.S. Cl.
CPC ............. *G01C 21/30* (2013.01); *G01C 21/32* (2013.01)

(58) Field of Classification Search
CPC ................................ G01C 21/30; G01C 21/32
USPC .......................................................... 701/420
See application file for complete search history.

(56) References Cited

U.S. PATENT DOCUMENTS

| | | | |
|---|---|---|---|
| 5,422,815 A | 6/1995 | Hijikata | |
| 6,560,531 B1 | 5/2003 | Joshi | |
| 2002/0177947 A1 | 11/2002 | Cayford | |
| 2006/0178809 A1 | 8/2006 | Couckuyt et al. | |
| 2011/0313648 A1* | 12/2011 | Newson | G01C 21/30 |
| | | | 701/447 |
| 2013/0151138 A1 | 6/2013 | Chunhua | |

OTHER PUBLICATIONS

Search Report of UK application No. 1613105.4 dated Jan. 31, 2017.
(Continued)

*Primary Examiner* — Gertrude Arthur Jeanglaude
(74) *Attorney, Agent, or Firm* — Park, Vaughan, Fleming & Dowler LLP

(57) ABSTRACT

An advanced map matching algorithm is disclosed, which embeds the road topology inherently in a set of path candidates. Road connectivity is maintained even in special situations such as U-turns, reverse driving, and tunnels. Careful path candidate management is designed to reduce the candidate count while preserving well-matching candidates. Paths are treated and evaluated independently using multiple criteria, which makes the algorithm reliable and robust in different scenarios.

20 Claims, 5 Drawing Sheets

(56) References Cited

OTHER PUBLICATIONS

Quddus, M. et al., Current Map-matching Algorithms for Transport Applications: State-of-the Art and Future Research Directions, Transportation Research Part C, Emerging Technologies, Pergamon, New York, NY, vol. 15, No. 5, Sep. 2007.
Search Report for International Application No. PCT/EP2017/069139 dated Nov. 7, 2017.
Search Report for International Application No. PCT/EP2017/069153 dated Nov. 7, 2017.

* cited by examiner

METHODS AND SYSTEMS FOR MAP MATCHING

CROSS-REFERENCE TO RELATED APPLICATIONS

The present application is a National Stage of International Application No. PCT/EP2017/069139, filed on Jul. 28, 2017, and designating the United States, which claims benefit to United Kingdom Patent Application 1613105.4 filed on Jul. 29, 2016 and to United Kingdom Patent Application 1617407.0 filed on Oct. 13, 2016. The entire content of these applications is incorporated herein by reference.

FIELD OF THE INVENTION

The present invention relates to methods and systems for matching a current position of a device to an electronic map indicative of a navigable network.

BACKGROUND OF THE INVENTION

Portable navigation devices (PNDs) that include GPS (Global Positioning System) signal reception and processing functionality are well known, and are widely employed as in-car or other vehicle navigation systems. In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions. Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Navigation devices also typically have access to a digital map representative of a navigable network on which the vehicle is travelling. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments (or "arcs") defined by a start (or "tail") node and end (or "head") node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

Navigation devices typically include a global navigation satellite system (GNSS) sensor by means of which timing and positioning data encoded in satellite-broadcast signals can be received and subsequently processed to determine a position of the device at a current time, together with other information such as speed, heading, etc. GNSS sensors are often based on GPS, formally known as NAVSTAR, but could additionally or alternatively be based on Russia's GLOSNASS, the European Galileo positioning system, COMPASS positioning system or IRNSS (Indian Regional Navigational Satellite System). Vehicle navigation devices also typically have access to inertial navigation sensors, also referred to as dead-reckoning (DR) sensors, that can be used to determine a relative position of the device, i.e. wherein a new position is based on the heading and distance traversed from a previous position, rather than an absolute position (as is the case with the GNSS sensor). DR sensors include a sensor for measuring distance traversed, such as speedometer, odometer, accelerometer, etc., and a sensor for measuring a heading, such as gyroscope, etc. In many cases, data from GNSS sensors and DR sensors are combined such that a current position of a device is always available even when satellite signals are partially or completely blocked.

The utility of such navigation devices is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations. Typically, the navigation device is enabled by route planning software for searching for a "best" or "optimum" route between the start and destination address locations from the map data. A "best" or "optimum" route is determined on the basis of predetermined criteria and need not necessarily be the fastest or shortest route. The searching for a route along which to guide the driver can be very sophisticated, and the search may take into account historical, existing and/or predicted traffic and road information. During navigation along a calculated route, it is usual for such devices to provide visual and/or audible instructions to guide the user along a chosen route to the end of that route, i.e. the desired destination. It is also usual for devices to display map information on-screen during the navigation, such information regularly being updated on-screen so that the map information displayed is representative of the current location of the device, and thus of the user or user's vehicle if the device is being used for in-vehicle navigation.

As will therefore be appreciated, an important process in navigation devices is to determine a corresponding position on the digital map to a current position of the device, e.g. as determined by a positioning engine based on GNSS sensors and/or DR sensors. This process is commonly referred to as map matching. Various examples of map matching algorithms are described in the article "Current map-matching algorithms for transport applications: state-of-the art and future research directions", Transportation Research Part C: Emerging Technologies, vol. 15, no. 5, pp. 312-328 (2007) by Quddus et al.

FIG. 1 shows an exemplary functional design of positioning and map matching system. In the system, data is received and processed by a positioning engine (e.g. software module) 20 from at least one of a GNSS sensor 10 and a DR sensor 12 to continually output position data. This position data, i.e. each position sample, includes at least a set of geographic coordinates, such as latitude and longitude, but will also typically include information such as heading, speed and distance travelled (since from the previous position sample). The positon samples are input to a map matching engine 30, which has access to digital map data in a storage means 32, and outputs, for each position sample, a corresponding map matched position, e.g. as data identifying a segment of the digital map and an offset from the head or tail node. The map matched position is received by one or more client devices or software modules 40, for example, for use in determining a route from a current position to a destination, generating a visual representation of the digital map with an icon indicating the current position of the device, etc.

The earliest map matching approaches include point-to-point and point-to-curve matching, which snap individual position samples to the nearest nodes or segments of the digital map, based on a distance measure. These approaches are described in more detail, for example, in the article "Some map matching algorithms for personal navigation assistants", Transportation Research Part C, vol. 8, pp. 91-108 (2000) by White et al. However, due to the dual uncertainty and inaccuracy involved in both the position samples received from the positioning engine and the digital map (that is representative of a navigable network, e.g. a road network), such approaches are extremely prone to errors. In particular, urban areas with high road density, complex intersections, and highways with parallel or stacked roads are especially difficult to resolve correctly. Two typical approaches have been used to improve these early matching algorithms. One approach has been to introduce more measures in addition to the distance measure, such as: heading; distance travelled; and segment attributes, such as turn restrictions. Another approach has been to incorporate network topology and to maintain the map matched results topologically integrity. However, such systems may be undesirably complex.

The Applicant has realised that there remains a need for improved methods and systems for map matching positional data.

SUMMARY OF THE INVENTION

In accordance with a first aspect of the invention there is provided a method of matching a current position of a device to an electronic map indicative of a network of navigable elements within a geographic area, the electronic map comprising a plurality of segments representative of the navigable elements, the method comprising:

obtaining positional data indicative of the movement of the device, the positional data comprising a plurality of position data samples indicative of the position of the device at different times;

obtaining electronic map data in respect of at least a portion of the area covered by the electronic map; and maintaining a pool of candidate paths with respect to the electronic map, each candidate path being a possible path through the electronic map to which the current position of the device may be matched, each candidate path comprising one or more segments of the electronic map, wherein said maintaining further comprises updating the pool of candidate paths by expanding one or more of the candidate paths to provide an expanded candidate path including at least a segment connected to the segment providing a head end of the original candidate path, wherein the method further comprises:

identifying a candidate path from the pool which provides the best match to the positional data, based on a plurality of said position data samples;

using the identified candidate path in obtaining an estimated current position of the device with respect to a segment of the electronic map for output as the map matched current position; and generating data indicative of the map matched current position.

The present invention extends to a system for carrying out a method in accordance with any of the aspects or embodiments of the invention herein described. Thus, in accordance with a second aspect of the invention there is provided a system for matching a current position of a device to an electronic map indicative of a network of navigable elements within a geographic area, the electronic map comprising a plurality of segments representative of the navigable elements, the system comprising:

means for obtaining positional data indicative of the movement of the device, the positional data comprising a plurality of position data samples indicative of the position of the device at different times;

means for obtaining electronic map data in respect of at least a portion of the area covered by the electronic map; and means for maintaining a pool of candidate paths with respect to the electronic map, each candidate path being a possible path through the electronic map to which the current position of the device may be matched, each candidate path comprising one or more segments of the electronic map, wherein said maintaining further comprises updating the pool of candidate paths by expanding one or more of the candidate paths to provide an expanded candidate path including at least a segment connected to the segment providing a head end of the original candidate path, wherein the system further comprises:

means for identifying a candidate path from the pool which provides the best match to the positional data, based on a plurality of said position data samples;

means for using the identified candidate path in obtaining an estimated current position of the device with respect to a segment of the electronic map for output as the map matched current position; and means for generating data indicative of the map matched current position.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The method of the present invention may be implemented in the context of a navigation operation. Thus, the method may be carried out by a set of one or more processors of a device or system having navigation functionality. However, it will be appreciated that the methods may also be carried out by any suitable system having map matching capability, but not necessarily navigation functionality. For example, the methods may be implemented by a computer system, e.g. a desktop or laptop system, which does not have navigation functionality, and/or an Advanced Driving Assistance System (ADAS) that can be arranged to automatically control one or more systems within a vehicle.

The methods of the present invention may be implemented using any system configured to provide the stated functionality. The steps may be performed by a map matching engine.

The methods of the present invention may be carried out by a mobile device. The mobile device has a memory and a set of one or more processors. Such a device may be a dedicated navigation device e.g. having any of the features described in the background section above. Such a device may be a portable navigation device, or an integrated in-vehicle device. The system may form part of an Advanced Driver Assistance System (ADAS). However, in other embodiments the mobile device may be any suitable mobile device, such as a mobile phone or tablet device, running appropriate software. Generally, the mobile device will have position determining functionality. Typically, the mobile device will have a display for displaying an indication of the current position with respect to the electronic map to a user. Alternatively the methods of the present invention may be carried out by a server. Other embodiments are envisaged in which the methods of the present invention are performed by a combination of a server and a mobile device. Accordingly, the system of the present invention may comprise a mobile device and/or a server arranged to perform the steps described. It will be appreciated that the map matching steps of the present invention may be carried out by a map matching module that is decoupled from other modules that may use the map matched data, e.g. a routing engine, and likewise the map matching module may be decoupled from modules providing positioning data on which the map matching module operates.

The method involves obtaining electronic map data and positional data indicative of the movement of a device for matching to the map. The electronic map data and the positional data provide the input data to the map matching engine.

The method may comprise the step of obtaining electronic map data from a map database for use in the map matching method. The step of obtaining the electronic map may comprise requesting the data from a local or remote source. The method may comprise requesting electronic map data relating to a region selected based on the position sample to be matched (i.e. the most recent position sample). For example, the electronic map data may be data relating to a region of predetermined shape, e.g. a polygon, such as a rectangle, selected based on the position sample to be matched. The region may include, e.g. be centred on, the position. In some embodiments the map matching method may be performed by a system which comprises a memory storing a map database. However, in other embodiments, the map database may be a remote map database, e.g. of a server. The step of requesting electronic map data may be repeated as required to obtain further electronic map data, e.g. when a current position nears a boundary of a region for which electronic map data was previously stored.

The electronic map comprises a plurality of segments connected by nodes, and representing navigable elements of a navigable network in the area covered by the electronic map. The nodes connected by the segments of the electronic map may be indicative of real-world nodes, e.g. intersections of elements of the navigable network, or artificial nodes, which, as described above, may be introduced into an electronic map to provide anchors for segments which have at least one end which is not defined by a real world node. This may be useful to divide a segment extending between real world nodes in order to be able to associate different attributes with parts of that segment, such as different road characteristics e.g. speed limits, shape information etc. While embodiments of the present invention are described with reference to navigable elements in the form of road segments, it should be realised that the invention may also be applicable to other navigable segments, such as segments of a path, river, canal, cycle path, tow path, railway line, or the like. For ease of reference these are commonly referred to as a road segment.

Each node of the electronic map is associated with positional data, indicative of the real world position of the node. Each node may be associated with positional date indicative of a longitudinal and latitudinal position of the node. Each segment of the electronic map is indicative of connectivity between nodes of the map. A segment is directional, and may indicate that the segment is uni-directional (i.e. the navigable element represented by the segment can be traversed in only one direction) or bi-directional (i.e. the navigable element represented by the segment an be traversed in both directions). Each segment may extend between a tail node and a head node. Typically each segment is a straight-line segment. In other words, the electronic map indicates the topology and connectivity of the navigable network that it represents.

The method comprises obtaining positional data indicative of the movement of a device. The positional data comprises a plurality of position samples, indicative of the position of the device at different times. Each position sample is indicative of the position of the device at the time to which it relates. The position data, e.g. position sample, relating to the most recent time may be referred to as the "current position". The method seeks to match the current position according to the positional data to a position on the electronic map. The positional data may be obtained, e.g. received, from any suitable position determining engine. The position determining engine may be local or remote. The step of obtaining the positional data preferably comprises obtaining the positional data from a remote position determining engine.

It will be appreciated that the present invention enables the map matching functionality, e.g. engine, to be decoupled from position determining functionality, e.g. engine. The map matching engine may map match the positional data at a different rate to the rate at which such data is received by the map matching engine, i.e. at a different rate to a rate at which a position determining engine provides position samples. For example, the map matching engine may process the data at a rate that is lower than the rate at which the position data samples are received. Further, positional data received by the map matching engine may not immediately be used in the map matching process.

The method may further comprise storing the obtained positional data (however it is obtained) in a memory. This may enable the data to be processed at a later stage, i.e. asynchronously by the map matching engine.

The positional data obtained is preferably associated with timing data. Preferably the positional data comprises a plurality of position samples, each position sample comprising data indicative of the position of the device and data indicative of the time to which the position relates. In preferred embodiments the positional data is time stamped positional data. Each position sample is then associated with a time stamp. Such embodiments including timing information for the positional data are appropriate where the map matching and position determining engines are decoupled from one another. However, it is envisaged that the position data need not necessarily be associated with timing information where this may be inferred in other ways by the map matching engine, or where it is not required, e.g. if the position determining engine and the map matching engine operate at the same rate. This may be the case if the map matching engine is not decoupled from the position determining engine. The method may comprise obtaining positional data comprising a plurality of position samples, and being associated with increasing time stamps.

In some embodiments the method may extend to the step of determining the positional data. The positional data may comprise any suitable data indicative of the position of the device. The device may be any device whose position is desired to be matched to a map. The device may be any mobile device, and may be a dedicated navigation device, or any device having navigation functionality, e.g. a mobile phone or similar running appropriate software. The device may be a device which performs the map matching steps of the present invention, or may be a remote device, e.g. where the map matching is carried out by a server. The device is typically associated with a vehicle.

The positional data may comprise any of the types of positional data described above. The positional data may be based on data provided by a GNSS sensor or sensors, such as GPS data, or any other data which may be obtained by one or more GNSS sensor, e.g. GLOSNASS, COMPASS or IRNSS. The positional data may alternatively or additionally be based on data obtained from one or more dead reckoning (DR) sensor, e.g. of a vehicle, arranged to provide data indicative of a relative position of the device. Thus, the positioning data may be any positioning data determined by a positioning engine based on GNSS sensor(s) and/or DR sensor(s). Each position sample will then comprise position data of any of the above types.

The positional data in respect of each time, i.e. the position data sample, includes at least a set of geographic coordinates, e.g. latitude and longitude. In some embodiments each positional data sample additionally includes data indicative of one or more of heading, speed and distance travelled. The heading and distance travelled data will be relative to the previous position sample. Each position sample may optionally include further data such as data indicative of an estimated accuracy of the data, slope, heading rate, etc.

The method typically comprises continually receiving position data samples indicative of a position of the device to be map matched. A positioning engine, however arranged, may continually output such data. The positioning data may comprise a plurality of positioning data samples, each in respect of a different time, e.g. a plurality of items of time stamped positional data. Each such position data sample may be matched to the map in accordance with the methods of the present invention herein described. The position samples may be sequentially matched to the map, each map matched position sample providing an updated map matched current position. As mentioned above, the map matching process may occur at a slower rate to the receiving of the position samples, or otherwise with some delay. The most recently matched position sample will be considered to provide the map matched current position, although in reality, the current position of the device may have advanced by that time.

In accordance with the present invention, the method comprises maintaining a pool of candidate paths with respect to the electronic map. Each path is a candidate path in that it is a possible path through the electronic map to which the (current) position of the device may be matched. The pool is thus a dynamic pool, in that the candidate paths within the pool change over time. Paths may be modified, added, or deleted from the pool. Typically each segment of the electronic map is linear. Thus each candidate path may be a polyline, each comprising a plurality of segments of the electronic map.

In an initial start-up situation, such as when starting up after a standstill period, or when coming from an off-road position, the method may comprise identifying a plurality of segments in the electronic map within proximity to the current position, i.e. the first received position sample for use in providing a start-up set of a plurality of candidate paths. The method may comprise determining a polygon, e.g. a rectangle, or any other area, on the electronic map based on the current position, and identifying a plurality of segments of the electronic map which intersect the polygon or other area to be used in providing the respective candidate paths of the start-up set of candidate paths. The method may comprise taking into account factors such as distance from the current position, bearing, etc., in selecting the plurality of segments for the start-up set. The current position here will be the first received position sample after start-up.

After start up, the pool of candidate paths may be added to by expanding existing paths and/or adding new paths. Such steps may be carried out in response to received positional data. The pool may comprise first and second sets of candidate paths in respect of different driving directions, or may include only candidate paths in the current driving direction.

Each candidate path includes one or more of the segments of the electronic map. Each path is a continuous path. The path is an extended path, rather than a single point location. This enables matching of the current position to the map to take into account previous position samples, and hence a path travelled up to the current position. This may help to reduce errors associated with conventional point-to-point map matching techniques discussed above. However, the present invention includes additional steps which provide further improvements in map matching accuracy than may be obtained using prior art curve-to-curve type map matching methods, which also considered an extended location.

Preferably at least some of the candidate paths comprise a first segment of the electronic map and at least a segment connected to the first segment. In other words, at least some of the candidate paths extend across a node of the electronic map, between connected segments.

In accordance with the invention the method comprises updating the pool of candidate paths by expanding one or more of the candidate paths. Each segment of the electronic map has a head (node) and a tail (node), the head (node)

being the forward end of the segment, i.e. in the direction to which the segment is heading, and the tail (node) being the rear end of the segment from which the segment emanates. Likewise, each candidate path has a head end at the forward end, i.e. in the direction in which the path is heading, and a tail end at the rear end of the path. The method comprises expanding the candidate path to provide an expanded candidate path including at least a segment connected to the segment providing a head end of the original candidate path. The segments will be connected to one another at a node. The connected segment is typically an outgoing segment at a node where the head end of the segment of the original candidate path terminates. The distance to which a candidate path is expanded along the connected segment may be chosen as desired. For example, this may be a predetermined distance, or may be up until the next node, etc. The distance may depend upon the type of segment. For example, where the segment is a highway segment, it may be necessary to expand the path further to encounter a next node than where the segment is part of an urban road network. It is envisaged that the path may be expanded to a further segment connected to the first connected segment. It will be appreciated that expanding occurs in the direction of travel. The expanded candidate path is added to the pool of candidate paths.

By expanding candidate paths in the manner described, the pool of candidate paths generated will inherently include road connectivity information, resulting in improved ability to accurately map match the current position, even in more complicated situations, such as where the current position is in the vicinity of a roundabout, or parallel roads are present. By building such topological information into the candidate path data, the need to consider topological features, e.g. connectivity, between segments when carrying out the subsequent parts of the matching process, e.g. when deciding which segment to match the position to, the map matching process is simplified. The step of expanding the original candidate path is carried out in the forward direction, i.e. the direction of movement.

The or each path to be expanded is preferably selected based on the positional data. The or each path that is expanded is preferably a path to which the position of the device has previously been matched. The step of expanding the path may then be triggered when the (most recent) map matched position of the device is in proximity to the head end of the path. For example, this may be when the map matched position is within a predetermined distance of the head end of the path. In this situation, the next sample of position data to be map matched is likely to fall into the region beyond the head end of existing path. By expanding the path when the map matched position nears its end, a candidate path is created extending on to a connected segment, to provide a suitable candidate path for matching of the next sample of position data, providing continuity in the matching process even in the region of intersections, etc. However, by expanding the path only when the map matched position nears the head end of the path, the number and length of the paths in the candidate path pool may be kept to a more manageable level.

In many cases, the segment providing the head end of a candidate path may terminate at a node, having multiple outgoing segments. The segment providing the head end of the candidate path is then connected to multiple segments. In this situation, the method may comprise expanding the candidate path to provide an expanded candidate path including at least one of the outgoing segments connected to the segment providing a head end of the original candidate path at the node, and generating at least one additional candidate path comprising at least one of the other outgoing segments connected to the segment providing the head end of the original candidate path at the node. The or each additional candidate path may further comprise a portion leading up to the node corresponding to the original candidate path. In other words, the original candidate path may be copied, and expanded in a different manner, to provide one or more further unique candidate path. This process may be carried out for each segment emanating from the node.

Each expanded candidate path may be described as an ordered sequence of two or more segments of the electronic map. Each candidate path determined is a different i.e. unique path. As mentioned above, while each candidate path is unique, different candidate paths may share a common portion, e.g. corresponding to the original candidate path that is expanded. The original candidate path may be copied to provide a portion of multiple new candidate paths.

The method may comprise storing data indicative of each of the candidate paths in the candidate pool in a candidate path database. When a path is expanded or added, the method comprises storing data indicative of the expanded or new path in the database. The data indicative of a candidate path may be indicative of an ordered sequence of map segments defining the path. The database may be stored in a local or remote memory, or a combination thereof, but preferably is stored locally.

It will be appreciated that different ones of the plurality of candidate paths may be expanded at different times to provide expanded candidate paths in the pool of candidate paths, i.e. when a current position nears an end of the respective original candidate path.

It will be appreciated that, over time, as the device moves, and new position samples are received, the number of candidate paths in the pool of candidate paths will increase. In accordance with embodiments of the invention, steps are preferably taken to actively manage the pool of candidate paths. This may help to keep the number of candidate paths and/or the length of the paths to a manageable level, to enable the map matching process to proceed efficiently. The method may comprise discarding paths and/or reducing the length of candidate paths. The method may comprise removing at least a portion of overlapping portions of paths. Actively managing the candidate path pool may comprise updating the candidate path database to reflect the changes to the candidate data pool.

These steps may be based on various criteria. For example, candidate paths may include overlapping portions, e.g. tail portions. This may be the result of expanding candidate paths when the current position nears an intersection having two or more outgoing segments as described above. The original candidate path may be copied to form part of a plurality of new unique paths continuing along different segments from the intersection. The method of managing the candidate path pool may include the step of pruning candidate path tail portions. The method may comprise identifying and pruning tail portions that are shared between different ones of the candidate paths, e.g. removing common ancestor portions of the paths. These tail portions typically become redundant in the matching process, as the current position advances beyond the head of the original candidate path.

Paths may be discarded based on the results of matching the positional data to candidate paths to determine a candidate path that is the best match to the positional data. This may be the case where paths are found to have too great an offset in relation to the positional data and/or when paths are found to have a low level of likelihood of matching the path travelled.

The management of the pool of candidate paths may be controlled based upon the properties of the navigable network in the region being traversed. Where the navigable network is a dense urban road network, for example, there will be relatively many nodes. This will result in frequent expansion and multiplying of paths. On the other hand, when travelling along a highway, there will be relatively few nodes, and map segments will tend to be longer. In this scenario, the pool of candidate paths will not increase at so great a rate. More aggressive management of the pool is therefore beneficial in the urban environment to keep the pool to a manageable level.

In certain special cases, adaptation of the candidate pool may be required to provide useful candidate paths. One such case is where the current position in a tunnel. In some embodiments the method may comprise determining that the current position is in, or approaching, a tunnel. This may be inferred from an absence of satellite based positioning data for a period exceeding a given threshold. An approaching tunnel may be detected using map data. The method may then comprise expanding candidate paths only along segments that lead to an exit of the tunnel.

In accordance with a further aspect of the invention there is provided a method of matching a current position of a device to an electronic map indicative of a network of navigable elements, the electronic map comprising a plurality of segments representative of the navigable elements, the method comprising:

obtaining positional data indicative of the movement of the device, the positional data comprising a plurality of position data samples indicative of the position of the device at different times;

obtaining electronic map data in respect of at least a portion of the area covered by the electronic map; and maintaining a pool of candidate paths with respect to the electronic map, each candidate path being a possible path through the electronic map to which the current position of the device may be matched, each candidate path comprising one or more segments of the electronic map, wherein said maintaining further comprises, upon detecting that the current position is in, or approaching a tunnel, updating the pool of candidate paths by expanding one or more of the candidate paths to provide an expanded candidate path including at least a segment connected to the segment providing a head end of the original candidate path, wherein the segment is a segment that leads to an exit of the tunnel, wherein the method further comprises:

identifying a candidate path from the pool which provides the best match to the positional data, based on a plurality of said position data samples;

using the identified candidate path in obtaining an estimated current position of the device with respect to a segment of the electronic map for output as the map matched current position; and generating data indicative of the map matched current position.

The present invention extends to a system for carrying out a method in accordance with any of the aspects or embodiments of the invention herein described. Thus, in accordance with another aspect of the invention there is provided a system for matching a current position of a device to an electronic map indicative of a network of navigable elements, the electronic map comprising a plurality of segments representative of the navigable elements, the system comprising:

means for obtaining positional data indicative of the movement of the device, the positional data comprising a plurality of position data samples indicative of the position of the device at different times;

means for obtaining electronic map data in respect of at least a portion of the area covered by the electronic map; and means for maintaining a pool of candidate paths with respect to the electronic map, each candidate path being a possible path through the electronic map to which the current position of the device may be matched, each candidate path comprising one or more segments of the electronic map, wherein said maintaining further comprises, upon detecting that the current position is in, or approaching a tunnel, updating the pool of candidate paths by expanding one or more of the candidate paths to provide an expanded candidate path including at least a segment connected to the segment providing a head end of the original candidate path, wherein the segment is a segment that leads to an exit of the tunnel, wherein the system further comprises:

means for identifying a candidate path from the pool which provides the best match to the positional data, based on a plurality of said position data samples;

means for using the identified candidate path in obtaining an estimated current position of the device with respect to a segment of the electronic map for output as the map matched current position; and means for generating data indicative of the map matched current position.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention in accordance with these further aspects is a computer implemented invention, and any of the steps described in relation to any of the aspects or embodiments of the invention may be carried out under the control of a set of one or more processors. The means for carrying out any of the steps described in relation to the system may be a set of one or more processors.

In embodiments in which the head end of a candidate path terminates at a node, having multiple outgoing segments leading to an exit of the tunnel, the method may comprise expanding the candidate path to provide an expanded candidate path including at least one of the outgoing segments connected to the segment providing a head end of the original candidate path at the node, and generating at least one additional candidate path comprising at least one of the other outgoing segments connected to the segment providing the head end of the original candidate path at the node. The or each additional candidate path may further comprise a portion leading up to the node corresponding to the original candidate path. In other words, the original candidate path may be copied, and expanded in a different manner, to provide one or more further unique candidate path. This process may be carried out for each segment emanating from the node that leads to an exit of the tunnel.

Another special case is where a U-turn is detected. In this situation, additional candidate paths may be created with directions opposite to those previously included in the pool.

In embodiments, the dynamic pool of candidate paths includes a first set of candidate paths, each path being a possible path in a first driving direction through the electronic map to which the current position of the device may be matched, and the method comprises, upon detecting that a U-turn manoeuvre has been performed by the device, creating an additional set of candidate paths for inclusion in the dynamic pool, wherein each candidate path is a possible path in a second, opposite driving direction through the electronic map to which the current position of the device may be matched, each candidate path comprising at least a portion of one or more segment of the electronic map. The additional set of candidate paths may be used in map matching while the driving direction remains reversed. However, preferably the original set of candidate paths are maintained, in case the U-turn detection is erroneous, and the driving direction remains unaltered, e.g. in the event of a hairpin bend being confused with a U-turn. Maintaining both sets of paths allows continuous map matching as driving direction varies. Paths relating to a previous driving direction may gradually be discarded, as matching proceeds.

In accordance with a further aspect of the invention there is provided a method of matching a current position of a device to an electronic map indicative of a network of navigable elements, the electronic map comprising a plurality of segments representative of the navigable elements, the method comprising:

obtaining positional data indicative of the movement of the device, the positional data comprising a plurality of position data samples indicative of the position of the device at different times;

obtaining electronic map data in respect of at least a portion of the area covered by the electronic map; and maintaining a pool of candidate paths with respect to the electronic map, each candidate path being a possible path in a first driving direction through the electronic map to which the current position of the device may be matched, each candidate path comprising one or more segments of the electronic map, wherein said maintaining further comprises, upon detecting that a U-turn manoeuvre has been performed by the device, creating an additional set of candidate paths for inclusion in the pool, wherein each candidate path is a possible path in a second, opposite driving direction through the electronic map to which the current position of the device may be matched, each candidate path comprising one or more segments of the electronic map, wherein the method further comprises:

identifying a candidate path from the pool which provides the best match to the positional data, based on a plurality of said position data samples;

using the identified candidate path in obtaining an estimated current position of the device with respect to a segment of the electronic map for output as the map matched current position; and generating data indicative of the map matched current position.

The present invention extends to a system for carrying out a method in accordance with any of the aspects or embodiments of the invention herein described. Thus, in accordance with another aspect of the invention there is provided a system for matching a current position of a device to an electronic map indicative of a network of navigable elements, the electronic map comprising a plurality of segments representative of the navigable elements, the system comprising:

means for obtaining positional data indicative of the movement of the device, the positional data comprising a plurality of position data samples indicative of the position of the device at different times;

means for obtaining electronic map data in respect of at least a portion of the area covered by the electronic map; and means for maintaining a pool of candidate paths with respect to the electronic map, each candidate path being a possible path in a first driving direction through the electronic map to which the current position of the device may be matched, each candidate path comprising one or more segments of the electronic map, wherein said maintaining further comprises, upon detecting that a U-turn manoeuvre has been performed by the device, creating an additional set of candidate paths for inclusion in the pool, wherein each candidate path is a possible path in a second, opposite driving direction through the electronic map to which the current position of the device may be matched, each candidate path comprising one or more segments of the electronic map, wherein the system further comprises:

means for identifying a candidate path from the pool which provides the best match to the positional data, based on a plurality of said position data samples;

means for using the identified candidate path in obtaining an estimated current position of the device with respect to a segment of the electronic map for output as the map matched current position; and means for generating data indicative of the map matched current position.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention in accordance with these further aspects is a computer implemented invention, and any of the steps described in relation to any of the aspects or embodiments of the invention may be carried out under the control of a set of one or more processors. The means for carrying out any of the steps described in relation to the system may be a set of one or more processors.

Another special case is where reverse driving is detected. Reverse driving refers to backwards driving, i.e. in a reverse mode of the vehicle, rather than forward driving in an opposite direction, such as after a U-turn. Thus, a device, or vehicle with which the device is associated, will, when reversing, still be oriented in the same direction as during forward travel, but moving in an opposite direction. It has been found that for the purposes of map matching it is desirable to treat reverse driving as forward driving in an opposite direction, and to adapt and/or generate the candidate pool accordingly. This enables the map matching process to run in a forward direction during reverse driving. A heading of the device may be internally reversed before performing the map matching method to enable map matching to be performed in a forward driving direction. The heading associated with the map matched position should then be internally reversed once more following the map matching process.

In embodiments of the invention relating to reverse driving, detection of reverse driving may be detected in any suitable manner. Typically reverse driving is detected using dead reckoning sensor based positional data. DR sensor based positional data may indicate a negative distance travelled when reverse driving is being performed. Reverse driving can also be detected, for example, by analysing images from an image capture device, such as a camera, within the vehicle, e.g. a feature will increase in size in the captured image when driving forward and decrease in size when driving backwards for the case of a forward facing camera, or vice versa for a backward facing camera.

When reverse driving is detected, however this is achieved, a set of candidate paths may be created with directions opposite to those previously included in the pool. In embodiments, the dynamic pool of candidate paths is replaced, upon detecting that the device is moving in a reverse direction, with a new set of candidate paths, wherein each candidate path is a possible path in a second, opposite driving direction through the electronic map to which the current position of the device may be matched, each candidate path comprising one or more segment of the electronic map. The new set of candidate paths may be used in map matching while reverse driving continues. Once reverse driving stops, and the vehicle begins to again move in the first driving direction, then the dynamic pool of candidate paths is again replaced with a new set of candidate paths, wherein each candidate path is a possible path in the first driving direction through the electronic map to which the current position of the device may be matched, each candidate path comprising one or more segment of the electronic map.

In accordance with a further aspect of the invention there is provided a method of matching a current position of a device to an electronic map indicative of a network of navigable elements, the electronic map comprising a plurality of segments representative of the navigable elements, the method comprising:

obtaining positional data indicative of the movement of the device, the positional data comprising a plurality of position data samples indicative of the position of the device at different times;

obtaining electronic map data in respect of at least a portion of the area covered by the electronic map; and maintaining a pool of candidate paths with respect to the electronic map, each candidate path being a possible path in a first driving direction through the electronic map to which the current position of the device may be matched, each candidate path comprising one or more segments of the electronic map, wherein said maintaining further comprises, upon detecting that reverse driving is being performing, creating a new set of candidate paths to replace those in the pool, wherein each of the new candidate paths is a possible path in a second, opposite driving direction through the electronic map to which the current position of the device may be matched, each candidate path comprising one or more segments of the electronic map, wherein the method further comprises:

identifying a candidate path from the pool which provides the best match to the positional data, based on a plurality of said position data samples;

using the identified candidate path in obtaining an estimated current position of the device with respect to a segment of the electronic map for output as the map matched current position; and generating data indicative of the map matched current position.

The present invention extends to a system for carrying out a method in accordance with any of the aspects or embodiments of the invention herein described. Thus, in accordance with another aspect of the invention there is provided a system for matching a current position of a device to an electronic map indicative of a network of navigable elements, the electronic map comprising a plurality of segments representative of the navigable elements, the system comprising:

means for obtaining positional data indicative of the movement of the device, the positional data comprising a plurality of position data samples indicative of the position of the device at different times;

means for obtaining electronic map data in respect of at least a portion of the area covered by the electronic map; and means for maintaining a pool of candidate paths with respect to the electronic map, each candidate path being a possible path in a first driving direction through the electronic map to which the current position of the device may be matched, each candidate path comprising one or more segments of the electronic map, wherein said maintaining further comprises, upon detecting that reverse driving is being performing, creating a new set of candidate paths to replace those in the pool, wherein each of the new candidate paths is a possible path in a second, opposite driving direction through the electronic map to which the current position of the device may be matched, each candidate path comprising one or more segments of the electronic map, wherein the system further comprises:

means for identifying a candidate path from the pool which provides the best match to the positional data, based on a plurality of said position data samples;

means for using the identified candidate path in obtaining an estimated current position of the device with respect to a segment of the electronic map for output as the map matched current position; and means for generating data indicative of the map matched current position.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention in accordance with these further aspects is a computer implemented invention, and any of the steps described in relation to any of the aspects or embodiments of the invention may be carried out under the control of a set of one or more processors. The means for carrying out any of the steps described in relation to the system may be a set of one or more processors.

In accordance with the aspects and embodiments of the invention involving reverse driving, the step of creating the new set of candidate paths may comprise, for one or more, and preferably each, of the original set of candidate paths, expanding the candidate path a predetermined distance in the first driving direction, advancing the map matched current position by the predetermined distance along the candidate path to an artificial map matched current positon, and generating a candidate path in the second, opposite driving direction based on the artificial map matched current position. It has been found that it is advantageous to artificially advance the map matched current position in this way, and then generate a candidate path in the opposite direction based on the artificial map matched current position thus obtained, rather than based on the actual current map matched position. This may ensure that any intersection in front of the map matched current position is taken into account before a reverse candidate path is created, helping to maintain connectivity in the additional set of candidate paths created. This may result in improved map matching for the reasons discussed above, as topological information is inherently taken into account.

The step of expanding a candidate path of the original set of candidate paths a predetermined distance in the first driving direction may comprise expanding the path to provide an expanded candidate path including at least a segment connected to the segment providing a head end of the original candidate path. The segments will be connected to one another at a node. The connected segment is typically an outgoing segment at a node where the head end of the segment of the original candidate path terminates. Where the segment providing the head end of an original candidate path terminates at a node having multiple outgoing segments, the segment providing the head end of the candidate path is then connected to multiple segments. In this situation, the method may further comprise expanding the candidate path a predetermined distance in the first driving direction to provide an additional candidate path including another one of the outgoing segments connected to the segment providing a head end of the original candidate path at the node. This process may be carried out for each segment emanating from the node.

The generation of the candidate path in the second, opposite driving direction preferably comprises identifying the segment associated with the artificial map matched current position, and reversing the segment such that the head (node) and tail (node) of the segment are switched. The Accordingly, the step of expanding the path to create the candidate path in the second driving direction may comprise expanding the path to include at least a segment connected to the segment on which the artificial map matched current position lies. The segments will be connected to one another at a node. The segment will be a segment connected to a tail end of the segment with respect to the first driving direction, or the head end of the segment with respect to the second driving direction.

These new candidate paths in the second, opposite driving direction replace the original candidate paths in the pool of candidate paths. As will be appreciated, this is different from when the performance of a U-turn manoeuvre has been detected, since in this latter case both candidate paths in the first driving direction and the opposite, second driving direction are maintained in the pool.

In embodiments in which the new set of candidate paths are generated by expanding paths in the second driving direction from an artificially map matched current position, the method preferably comprises, for one or more, and preferably each, of the new candidate paths, moving the artificially map matched current position by the predetermined distance in the second driving direction to identify one or more map matched positions on the new candidate paths. This step compensates for the artificial movement of the map matched current position by the predetermined distance in the first driving direction performed in order to preferably generate the new candidate paths (in the second, opposite driving direction). Thus, while the current position was previously map matched to a segment of a candidate path from the original set of candidate paths in the first driving direction, it is now in a corresponding position on a segment forming part of a candidate path in the second, reverse driving direction.

It will be appreciated that the set of new candidate paths, i.e. in the second driving direction, are determined without using some of the restrictions taken into account when creating the original candidate paths. For example, segments relating to one-way streets of the road network, are considered in the second driving direction to always be traversable when generating candidate paths, whereas in the first driving direction they are considered to only be traversable in one direction, i.e. the legal direction, when generating candidate paths.

In accordance with the invention in any of its aspects or embodiments, the method comprises the step of identifying a candidate path from the pool which provides the best match to the positional data.

Preferably the method comprises matching the positional data to each of a plurality of candidate paths to determine the candidate path which provides the best match to the positional data. Preferably the step of matching the obtained positional data to each of the candidate paths is carried out independently for each candidate path. Preferably the matching step is carried out in relation to each candidate path of the candidate pool.

Matching the obtained positional data to a given candidate path is carried out using a plurality of the obtained position data samples (including the most recent or current position data sample). Thus, a position trace, or path, according to the positional data, is compared to the candidate path. The number of position samples taken into account, i.e. the length of the position trace, may be selected as desired, and may vary dynamically, and may be different for different matching criteria. The plurality of data samples include the most recent data sample, i.e. the current position to be matched to the map, and a set of one or more (preferably a plurality) of preceding data samples. Any reference to matching the positional data to a candidate path herein based on multiple position data samples may be understood in this way.

The method preferably comprises matching the positional data to each one of a plurality of the candidate paths, and preferably to each candidate path of the candidate path pool. In each case, a plurality of the data samples are taken into account. The same set or sets of data samples is typically used in the matching process in respect of each path. As mentioned above, different sets of data samples, i.e. of different size may be used in relation to different matching criteria.

In preferred embodiments, the method comprises, for each candidate path considered, matching the positional data to the candidate path according to each of a plurality of matching criteria. The matching criteria may be selected as desired. However, preferably the step of matching the obtained positional data to a given candidate path takes into account at least heading and position as determined using the positional data. Preferably matching is carried out independently in respect of each of the criteria. This may be achieved using independent matching engines for each of the criteria, e.g. heading and position. The matching engines are independent in that the matching in relation to one criterion does not influence the matching in relation to the other criterion.

The method preferably comprises providing, for each candidate path considered, a score indicative of the extent to which the positional data matches the candidate path, and ranking the candidate paths based at least on their respective scores. Where matching to a candidate path is carried out based upon multiple criteria, preferably a respective score indicative of the extent to which the positional data matches the candidate path is obtained for each one of the matching criteria, and the method comprises combining each score to provide an overall matching score for the candidate path.

This may be achieved by performing independent matching in respect of each of the criteria, as discussed above. In preferred embodiments, a respective matching score in respect of at least heading and position is therefore preferably obtained for each candidate path, and used in obtaining an overall matching score for the candidate path. The step of obtaining an overall matching score for a candidate path based on individual scores in respect of each of a plurality of matching criteria may be carried out in any suitable manner. Preferably techniques based on belief theory are used, e.g. Dempster-Shafer theory. However, other techniques such as Hidden Markov, Fuzzy Logic or Kalman Filter may be used.

The matching score in respect of a given candidate path is indicative of a likelihood, i.e. probability, that the positional trace defined by the positional data samples matches the path. This applies to any overall matching score and a score in respect of a particular criterion in preferred embodiments where such scores are determined.

Once a score has been obtained in respect of each candidate path considered, whether or not it is an overall score based upon scores determined based on multiple different matching criteria, the method may comprise ranking the candidate paths to allow a candidate path providing the best match to the positional data to be determined. The ranking is based at least on the score determined in respect of each candidate path. The ranking may take into account other factors, such as offset, as described below.

The step of actively managing the candidate path pool may alternatively or additionally comprise discarding one or more candidate paths from the pool based on the results of the matching process. This may involve removing the path(s) from a candidate path database. For example, paths found during the matching process to have too great an offset compared to the positional data trace may be discarded. Management of the pool of candidate paths may alternatively or additionally take into account the determined ranking of candidate paths. The method may comprise discarding one or more of the candidate paths from the pool based on the determined ranking of the candidate. This has been found to be more effective than discarding paths based on the absolute scores associated therewith. The ranking provides an indication of the relative relevance of a candidate path, which may not be influenced by factors such as the density of the surrounding road network, etc.

Performing independent matching in relation to multiple criteria, and then combining the results of the matching processes to provide an overall score indicative of the degree of match of a candidate path is advantageous, in that matching in relation to the different criteria may analyse different sources of error in both the positional data and the map data. This may lead to a more accurate determined estimated position. It is believed that such features are advantageous, independent of the context of using a pool of candidate paths, or of the case in which matching takes into account multiple position samples.

In accordance with a further aspect of the invention there is provided a method of matching a current position of a device to an electronic map indicative of a network of navigable elements within a geographic area, the electronic map comprising a plurality of segments representative of the navigable elements, the method comprising:

obtaining positional data comprising a position data sample indicative of the position of the device;

obtaining electronic map data in respect of at least a portion of the area covered by the electronic map;

using a first matching engine to provide, for each of a plurality of segments in a set of segments of the electronic map, a first score based on a first criterion indicative of the likelihood that the current position may be mapped to the segment of the electronic map;

using a second matching engine to provide, for each of the plurality of segments in the set, a second score based on a second criterion indicative of the likelihood that the current position may be mapped to the segment of the electronic map;

using at least the first and second scores to determine, for each of the plurality of segments in the set, an overall score indicative of the likelihood that the current position may be mapped to the segment;

using the overall scores determined in respect of the plurality of segments of the electronic map to obtain an estimated current position of the device with respect to a segment of the set of segments of the electronic map for output as the map matched current position; and generating data indicative of the map matched current position.

The invention also extends to a system for performing such a method in any of its aspects or embodiments. The system may be provided by a server, or a mobile device, or a combination thereof, as described in relation to the earlier aspects of the invention. Thus, in accordance with a further aspect of the invention there is provided a system for matching a current position of a device to an electronic map indicative of a network of navigable elements within a geographic area, the electronic map comprising a plurality of segments representative of the navigable elements, the system comprising:

means for obtaining positional data comprising a position data sample indicative of the position of the device;

means for obtaining electronic map data in respect of at least a portion of the area covered by the electronic map;

means for using a first matching engine to provide, for each of a plurality of segments in a set of segments of the electronic map, a first score based on a first criterion indicative of the likelihood that the current position may be mapped to the segment of the electronic map;

means for using a second matching engine to provide, for each of the plurality of segments in the set, a second score based on a second criterion indicative of the likelihood that the current position may be mapped to the segment of the electronic map;

means for using at least the first and second scores to determine, for each of the plurality of segments in the set, an overall score indicative of the likelihood that the current position may be mapped to the segment;

means for using the overall scores determined in respect of the plurality of segments of the electronic map to obtain an estimated current position of the device with respect to a segment of the set of segments of the electronic map for output as the map matched current position; and means for generating data indicative of the map matched current position.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention in accordance with these further aspects is a computer implemented invention, and any of the steps described in relation to any of the aspects or embodiments of the invention may be carried out under the control of a set of one or more processors. The means for carrying out any of the steps described in relation to the system may be a set of one or more processors.

The first and second matching engines are preferably independent from one another. The first and second criteria may be heading and position. One or more additional independent matching engines may be used to provide further scores in respect of respective further criteria.

The method comprises carrying out the matching steps using the first and second matching engines in respect of multiple segments of the electronic map, so as to provide scores in respect of each criterion for each such segment, and using the scores in respect of each criterion to obtain an overall score in respect of each segment as to the likelihood that the current position may be mapped to the segment. In other words, the steps of obtaining the first and second scores, and the overall score, are repeated for multiple segments of the map. The overall scores for the segments are used in estimating the current position of the device with respect to a segment of the electronic map.

The method may comprise identifying the segment that provides the best match to the positional data based on the overall scores. The method preferably comprises ranking each of the segments based at least on the likelihood that the current position may be mapped to the segment using the overall scores determined for the segments.

The matching may be carried out in any of the manners described in relation to the earlier aspects of the invention, i.e. based on the criteria mentioned, and the individual and overall scores may be obtained as described in relation to any of the earlier aspect. e.g. providing the overall score using belief theory.

In these further aspects and embodiments of the invention, at least the current position according to the positional data, i.e. a most recent position data sample, is used in determining the scores for each segment. In contrast to the earlier aspects of the invention, a single point position may therefore be used in the scoring steps. However, in other embodiments a plurality of position data samples are used. This may proceed as in the earlier aspects of the invention. The position data samples will include a most recent i.e. current position data sample. The positional data may be of any of the types earlier described. Where multiple position data samples are used, these are in respect of different times, and may be time stamped position data samples.

In these further aspects and embodiments, the step of a matching engine providing a score based on its respective criteria indicative of the likelihood that the current position may be mapped to the segment preferably comprises the matching engine matching the positional data to the segment based on its criteria. The score is based on the closeness of the match.

The positional data used in the matching process includes at least a current position according to the positional data, i.e. a most recent position data sample. The positional data used may be only a single data point, i.e. the current position, or may include a plurality of position data samples, i.e. the current position and one or more earlier position data points as described in relation to the earlier aspects of the invention. The matching processes may be carried out in any of the manners described in relation to the earlier aspects of the invention, other than that matching is to a segment of the electronic map, and not necessarily a candidate path. In other embodiments, it is envisaged that the segment may form part of a path through the electronic map, such that the matching process is carried out in relation to a path. This may proceed similarly to the earlier aspects of the invention. The path may or may not form part of a pool of paths.

In accordance with the invention in any of its aspects or embodiments, the matching in relation to each of the criteria preferably comprises the step of identifying a point on the candidate path (or segment in the further aspects) that provides the best estimate as to the current position of the device. The point is a point on a segment of the candidate path. The output of each matching process in respect of a given criteria (e.g. each matching engine) is therefore preferably data indicative of a point on the candidate path (or segment) that provides the best estimate as to the current position of the device according to the applicable matching criteria, and a respective matching score for the candidate path (or segment). Such data is preferably obtained at least in respect of matching based on position and heading. The best estimates as to current position of the device on a candidate path (or segment) determined by matching engines based on different criteria may differ. The method may further comprise the step of using the best estimates as to the current position of the device on a given candidate path (or segment) provided by each matching process to determine an overall best estimate as to the current position on the path (or segment). This may be carried out before or after ranking of paths (or segments). It is envisaged that such a step may only be performed in relation to a candidate path (or segment) that is determined to be the best match to the positional data rather than necessarily performing the step in relation to each candidate path (or segment) that is evaluated. It will be appreciated that the estimated current position determined for a candidate path (or segment), may not necessarily, even if the path (or segment) is the most likely path (or segment) determined, be the current position that is used as the output map matched position. This is described in more detail below.

It will be appreciated that in accordance with any of the aspects of the invention, matching may be carried out in relation to one or more further criteria which use a determined best estimate as to the current position of the device along a candidate path (or segment). Such matching may be considered to be dependent to some degree on the results of the matching on other criteria which determine such an estimate, and may provide further verification of the results. Such methods may use an overall best estimate of current position based on multiple matching processes. Examples of such further criteria include a distance travelled and speed limit matcher. The latter may determine the extent to which the speed at the best matched position on the path or segment corresponds to a speed limit for that position according to the map data. The former may consider distance travelled along the path or segment up to the estimated position. The results of any further such matching may be used to provide individual scores which may be taken into account in determining an overall matching score for the candidate path or segment as described above, e.g. using a belief theory.

In those aspects of the invention using candidate paths, the method comprises identifying a candidate path that provides the best match to the positional data. This step may be performed by a decision making engine. The identification of a candidate path that is considered to provide the best match may be based on ranking solely according to the matching score(s), or may take into account additional factors. These factors may be taken into account in the ranking process. In preferred embodiments the identification is based additionally on an offset between the positional data trace and the candidate path for each candidate path considered. It is advantageous to take into account both a likelihood that the path is the correct match, as indicated by the score for the path, and the offset between the candidate path and the path defined by the positional data. An offset is indicative of the extent to which the positional data trace would need to be shifted to match the candidate path. This will be based upon a trace having a length determined by a given number of position data samples considered in the matching process. The offset will depend upon factors such as map bias, e.g. map simplification, map errors, etc., and input positional data bias, e.g. multi-path effects, clock errors, etc. It has been found that both probability and offset based measures may fail at certain times. For example, probability or likelihood based measures will not distinguish between parallel roads, while offset will continually increase in a tunnel, where only DR data is available, due to DR drift. It is therefore advantageous to take into account both offset and probability, in order to increase the accuracy of map matching.

Likewise, in the further aspects of the invention that do not necessarily use candidate paths, the method may comprise identifying a segment that provides the best match to the positional data. This step may be performed by a decision making engine. The identification of a segment that is considered to provide the best match may be based solely on ranking according to the matching score(s), or may take into account additional factors. In preferred embodiments the selection is based additionally on an offset between the positional data and the segment for each segment considered. It is advantageous to take into account both a likelihood that the segment is the correct match, as indicated by the score for the path, and the offset between the segment and the positional data. An offset is indicative of the extent to which the positional data would need to be shifted to match the segment. While the positional data used may be a single point of data, so that the offset may be based on an offset between the point and the segment, in other embodiments, the positional data considered may comprise a plurality of position data samples defining a positional data trace (as in the earlier aspects of the invention). This will be based upon a trace having a length determined by a given number of position data samples considered in the matching process.

In those aspects and embodiments of the invention using a pool of candidate paths, the method comprises the step of using the identified best matching candidate path in obtaining an estimate of the current position of the device with respect to a segment of the electronic map for output as the map matched current position. The method may comprise obtaining an estimate as to the current position along a segment of the identified best matching candidate path, and using the estimated current position in obtaining the current position to be output. The estimated current position may be used as the current position to be output, or may be used in determining a current position to be output. As mentioned above, an estimate as to current position may be determined for each candidate path considered. This may be based on multiple such estimates determined for the path using different matching criteria. The step of using the identified candidate path in obtaining the estimate of current position for output may comprise obtaining an estimate of the current position along a segment of the identified candidate path. Such current position data may be associated with the candidate path, e.g. as a result of the matching process. Thus, the step may comprise the step of accessing the data, or may involve generating the data, e.g. based on multiple estimates for current position along the path obtained using the different matching criteria.

The estimated current position for output may or may not lie on the identified best matching candidate path. It will be appreciated that the steps of identifying a candidate path that best matches the positional data may be repeated for each new positional data sample. Thus, the identification of a best matching candidate path may then be continually updated. The candidate path that is identified as the best match to the positional data may correspond to a candidate path to which the last position data sample was matched. However, in some situations, the identified candidate path that is the best match to the new position data sample may differ from that identified in relation to the previous data sample. In such cases the decision engine may decide whether to "jump" to the new candidate path, or remain with the previous candidate path, even though it is no longer the best match. Such a determination may depend upon various factors. The decision engine may be arranged to minimise jumping. For example, jumps may be allowed where there has been a relatively large gap between input position data samples, e.g. due to a tunnel. On the other hand, if the jump would return to a previously passed segment, the decision engine may decide to remain with the previously identified candidate path. In some embodiments, the estimated current position for output is on a segment of a candidate path identified to be the best match to the positional data based on a previous set of positional data.

In some preferred embodiments, the estimated current position for output is a position along the identified best matching candidate path, or a best matching candidate path identified based on a preceding position data sample. The newly identified best matching path is used in the process of obtaining the estimated current position of the device in that it is compared to the existing best matching candidate path. The method may comprise comparing the identified candidate path to a previously identified candidate path and obtaining an estimated current position of the device for output that is on a segment of one or other of the paths. The selection of which path to base the current position on may be based on various criteria as described above. This process may be used when the best matching candidate path differs from the best matching candidate path to which the previous position data sample was matched. Alternatively or additionally, the step of using the identified candidate path in obtaining the estimated current position of the device for output may comprise obtaining an estimate of current position on a segment of the best matching candidate path, and additionally on one or more candidate paths in connected thereto, and choosing one of the estimated current positions as the position for output. This may help to account for input position data inaccuracy at intersections and bifurcations.

In the further aspects or embodiments of the invention that do not necessarily use candidate paths, the method comprises using the overall scores determined in respect of the plurality of segments of the electronic map to estimate a current position of the device with respect to a segment of the electronic map. This step preferably comprises identifying a segment that provides the best match to the positional data based on the scores. The method may comprise ranking the segments based at least on the scores, e.g. and optionally on offset. The overall scores are used to obtain an estimate of the current position of the device for output. As in the aspects and embodiments using candidate paths, the estimated position for output may or may not lie on a determined most likely segment. For example, the estimated position may be chosen to be on one of: the most likely segment; and one or more segments that connect thereto. Any of the techniques used in relation to the candidate path embodiments may be used.

References to the estimated current position for output in accordance with the invention in any of its aspects or embodiments refer to the finally determined current position that is output from the map matcher. The position may not necessarily be output to a user. For example, the determined position may be input to another part of a system, e.g. an ADAS system, routing engine, etc.

The generated data indicative of a map matched current position may be used as desired. For example, the data may be used to display an indication of the current position on the electronic map to a user, and/or may be used by a routing engine. The method may comprise storing the generated data. The data may be transmitted to a remote device for use by the device.

It will be appreciated that each received position sample may be matched to a position on a segment of the electronic map. However, to enable the movement of the device through the electronic map to be displayed to a user as a smooth progression, i.e. without jumping from one discrete map matched position to the next, a prediction of the future position(s) of the device is determined based on the map matched position data. The predicted position(s) may be used in rendering a representation of the path followed by the device on the electronic map. In accordance with the invention in any of its aspects or embodiments, the generated data indicative of a map matched current position may be input to a prediction engine for use in generating data indicative of one or more predicted updated position of the device. The prediction engine may be arranged to use the generated data indicative of the map matched current position to predict the position of the device at one or more future time. In other words, the prediction engine extrapolates the or each map matched current position. A given map matched current position may be used to provide one, or a plurality of predicted updated position samples. The prediction engine may provide an output set of a plurality of predicted position data samples having a frequency greater than an input set of map matched position data samples. The method may then comprise using the predicted position data provided by the prediction engine in displaying an indication of the position of the moving device on an electronic map. The prediction engine may operate in any suitable manner to provide suitable position predictions to enable a representation of the movement of the device to be displayed at a desired frame rate even where the map matched current position data samples is relatively sparse e.g. based on a frequency of received satellite based positional data. The prediction engine may take into account a latency of the positioning and map matching processes. The engine may take into account the acceleration and deceleration of the device. Where a map matched position is determined when driving is in a reverse direction i.e. during reverse driving, the prediction engine should be arranged to predict the position in the reverse direction. Thus, the output predicted position will follow a path in the reverse e.g. second driving direction.

In accordance with the invention in any of its aspects or embodiments, a single map matched current position is preferably generated in respect of each positioning input sample. The generated data may comprise data indicative of the position with respect to a given segment of the electronic map. The data may be indicative at least of the segment on which the position lies, and an offset from an end of the segment. The method may comprise generating data indicative of a sequence of segments traversed since the previous map matched position. The generated current position data may be associated with timing data indicative of the time to which the position relates, e.g. a time stamp.

It will be appreciated that the methods in accordance with the present invention may be implemented at least partially using software. It will thus be seen that, when viewed from further aspects and in further embodiments, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of further embodiments are set out hereafter, and further details and features of each of these further embodiments are defined in the accompanying dependent claims and elsewhere in the following detailed description.

BRIEF DESCRIPTION OF THE FIGURES

Embodiments of the invention will now be described, by way of example only, with reference to the accompanying Figures, in which.

DETAILED DESCRIPTION OF THE FIGURES

The techniques described herein relate to an advanced map matching algorithm, which embeds the road topology inherently in a set of candidate paths. Candidate paths are defined as all possible ways to traverse the map, passing from one node to another or one road segment to another, and as such are ordered sequences of road segments. The map matching algorithm described herein is designed scalably and modularly, so that it is easy to extend and trouble shooting. The algorithm maximally utilizes the road connectivity and restrictions to construct and maintain a pool of possible path candidates, which are used to match against the positioning data trace. Topological integrity is no longer necessary to be considered in the decision making process, as the road connectivity has been embedded in the candidate pool naturally, making many difficult situations such as parallel roads and roundabouts easier to solve.

Figure 1:
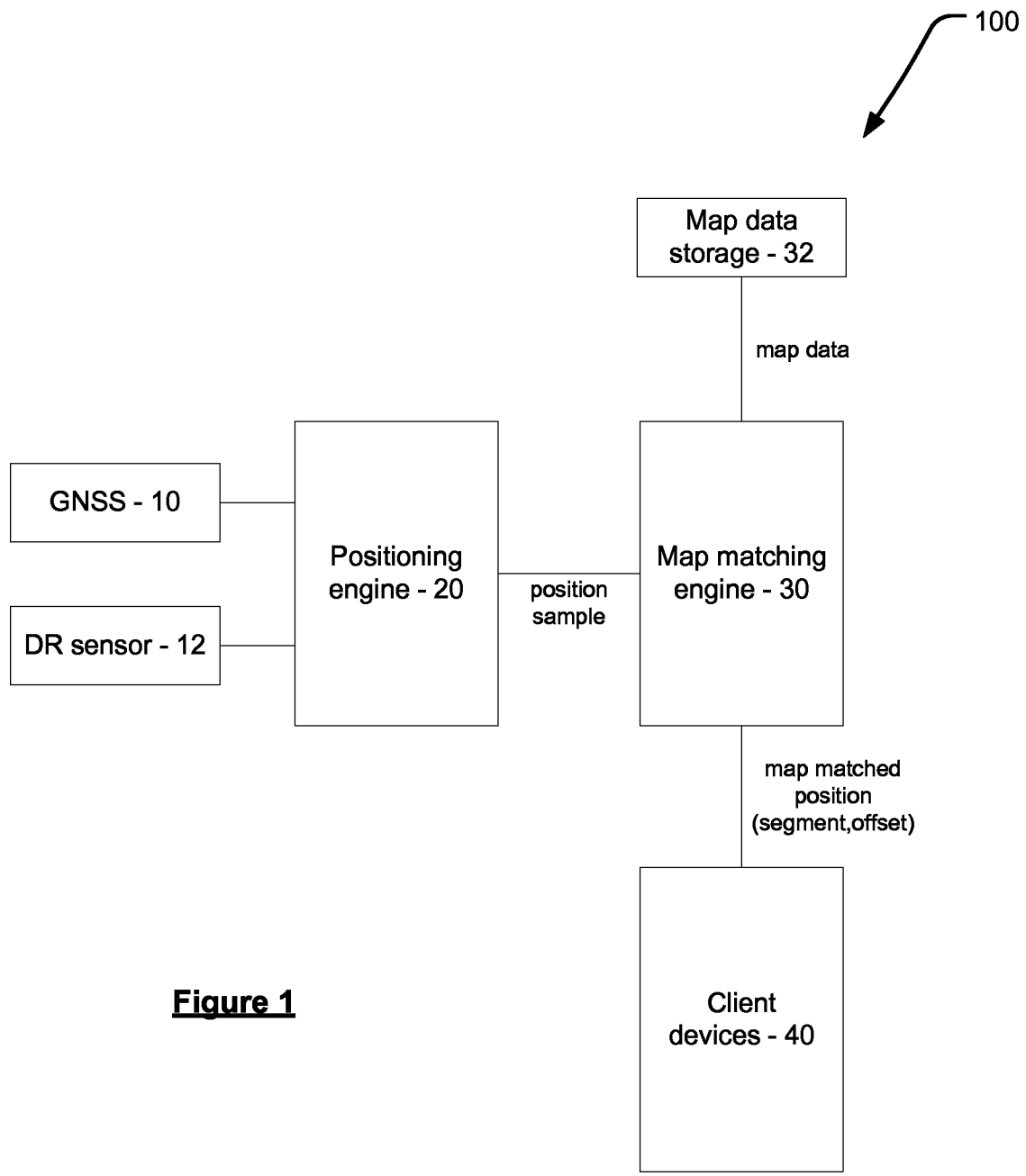
FIG. 1 shows an exemplary functional design of a positioning and map matching system.
Figure 2:
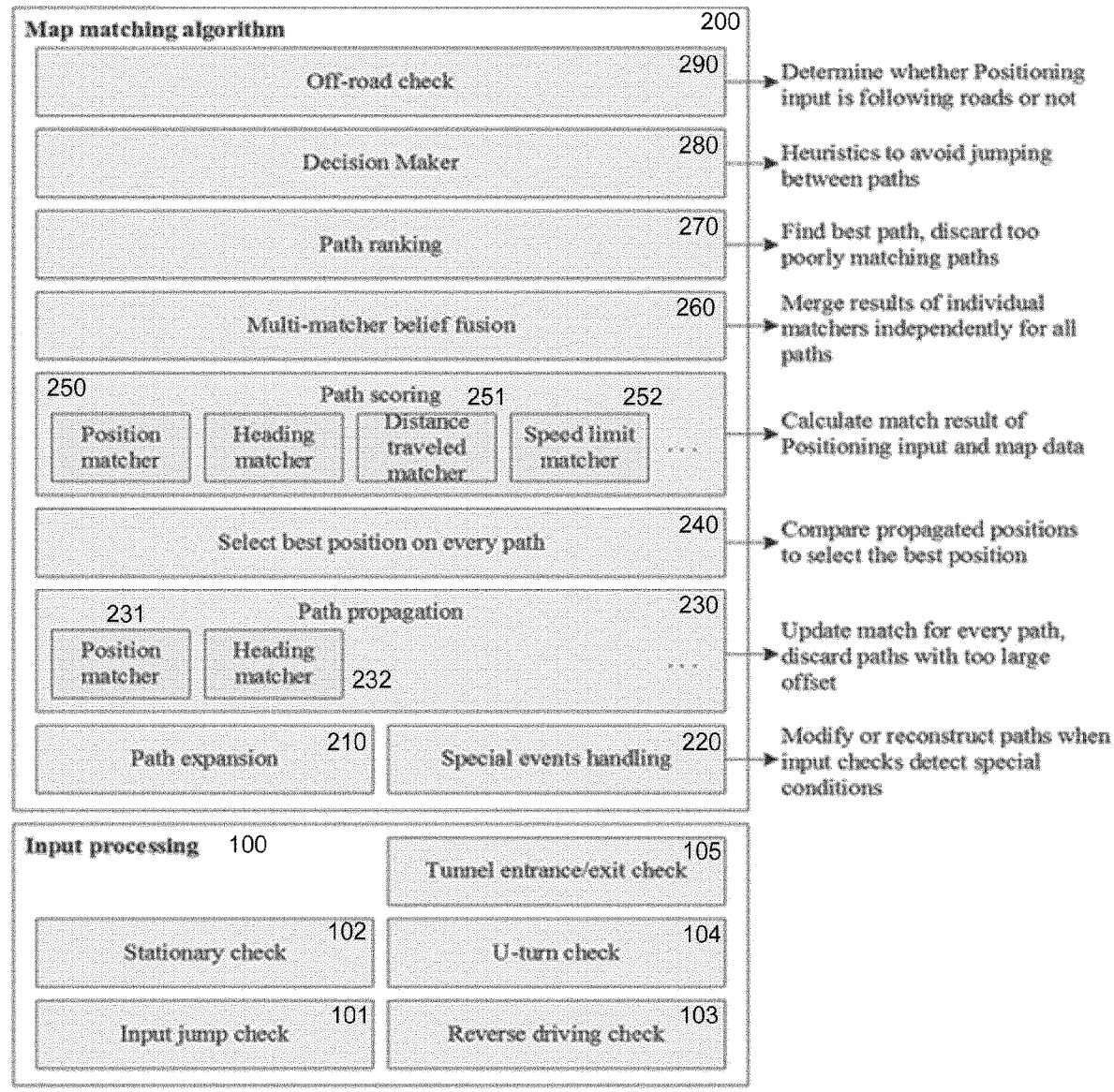
FIG. 2 illustrate the overall architecture of a map matcher according to an embodiment.

The overall architecture of the map matcher according to an embodiment is illustrated in FIG. 2. As shown, the map matcher consists of two separate layers: the input processing layer 100 and the map matching algorithm layer 200. The map matching algorithm layer 200 is responsible for constructing the path candidate pool, evaluating the match of the input trajectory against the candidates, and maintaining the path matching results by logically ranking paths and minimizing jumps between paths. The input processing layer 100 is responsible for accepting positioning input, sanitizing it, and detecting special driving conditions such as big input gaps, reverse driving, U-turns and tunnels. Special situations such as U-turn, tunnel and reverse driving are thus treated separately at the beginning of the map matching algorithm. When a special manoeuvre is detected, the map matching is prepared by properly constructing or expanding path candidates and the input data related to the manoeuvre are skipped. The topological map matching algorithm never processes the manoeuvre.

The map matcher program flow according to an embodiment will now be described in summary.

In the initial steps, when new input data arrives, before starting the actual path candidate processing and matching, the map matcher identifies certain special situations and reacts to them. The identification of these special situations is handled in the input processing layer 100 by dedicated modules such as a tunnel entrance/exit check module 105, a U-turn check module 104, a reverse driving check module 103, an input jump check module 101 and a stationary check module 102. After detecting any of these situations, the map matcher may react accordingly. For instance, if the car is detected as being stationary, then the map matcher does not need to run. Where a jump in input data, a U-turn or a tunnel is detected, the path candidates may need to be modified accordingly. Where it is detected that the car is moving in reverse, the driving direction may be internally reversed on input and output so that the map matcher can process it as forward movement. The detection of these situations in the input processing layer 100 is separated from the reaction to them in the map matching algorithm layer 200, which is dealt with by a special events handling module 220. The special events handling module 220 modifies or reconstructs the paths when the input checks have detected special conditions. This allows room for heuristics that deal with combinations of different special situations that may occur together. For example, a U-turn detected in combination with a tunnel exit may be a false positive and may require further analysis.

After the input processing, in the map matching algorithm layer 200, the map matcher first expands its path candidates forwards along the road network stored in the map. Each path comprises a number of connected road segments, and is expanded forwards to other connected road segments, to ensure that the road topology is embedded within the paths. This expansion may performed by a path expansion module 210. It is to be noted that the paths cannot contain e.g. any U-turns, because these are processed separately, in the input processing layer 100, as above.

The map matcher maintains multiple smaller algorithms called "matchers", which apply different criteria and heuristics to evaluate the match of the input data to a path. This evaluation is performed independently for each candidate path within the pool. Each matcher on each candidate path is first propagated forward with the new input data, producing an estimate of the correct place along the paths where the input is expected to project to. Each matcher then evaluates a score for the match of the path and the input data over a certain number of previous input data samples. The matches may include a position matcher 231 and heading matcher 232, which may both be provided in a path propagation module 230. The position matcher 231 evaluates input position co-ordinates (longitude, latitude) and compares these against the map geometry of the path. The heading matcher 232 evaluates input heading and distance travelled and compares these against the turning function of the path, which may also be determined from the map geometry. Even though these data sets may appear to be non-independent, the matchers 231,232 still operate on different aspects of the data, and therefore are capable of analysing different sources of error in both the position input data and the map data. The path propagation module 230 may also be responsible for candidate management, as described further below.

Each matcher attempts to find the best possible match between the input and a path, and may therefore end up propagating to different positions along a path. A heuristic is applied to select a single best position on each path. A further module 240 may be provided for comparing the propagated positions on each path to select the best position.

Further matchers such as a distance travelled matcher 251 and a speed limit matcher 252 may also be used. More matchers can be considered if more input information is available, such as slope. Match scores for each of the matchers may be obtained in a path scoring module 250. The match scores from each of the matchers 231,232,251,252 are then combined in a multi-matcher belief fusion module 260, independently for each path, to estimate the level of belief that the path is the correct path. Fusing multiple criteria in combination in the fusion module 260 enables high matching reliability with confidence.

Once each path has been assigned a combined multi-matcher belief fusion score, path ranking module 270 ranks the paths according to this score, and this ranking is used to find the best path. Poorly matching paths may be discarded at this stage. The final map matched position is chosen by evaluating the best position on the preferred path together with the best positions on other paths that are connected to it. This step may help account for input inaccuracy, e.g. at intersections or other bifurcations.

A decision maker 280 is used in a post-processing step wherein the new best path, as determined by the path ranking module 270, is compared to the previously determined best path, and a decision is made about whether to select the new best path as the preferred path. This step involves heuristics to decide whether to, and when, to show a jump from one path to another to the client, and eventually to the user. The final map matched position is chosen by evaluating the best position on the preferred path together with the best positions on other paths that are connected to it. This step may account for input accuracy at intersections and bifurcations, etc.

Finally, the final map matched position is analysed to determine whether the input is actually following the road or if the input is off-road. That is, an off-road check 290 may be implemented to evaluate whether the best matched location on the path is closed enough to the input, and if necessary, to trigger the off-road map matching which will be rely on point-to-curve matching principle.

Once a map matched current position has been obtained, it may be provided as an input to a prediction engine. The prediction engine takes map matched position samples and extrapolates the positions to obtain a predicted trajectory that may be used in rendering a representation of the movement of the device on a display. This enables a smooth trajectory to be displayed to a user. Without this step, if the map matched current position samples were simply displayed, there would be discrete jumps between each of the map matched position samples. The prediction engine takes the position sample data, which may be relatively sparse, and provides current position data extrapolated therefrom, at an appropriate higher frequency. In extrapolating each map matched position data, latency added by the positioning and map matching processes may be taken into account, and a dynamic model may be used to follow the acceleration and deceleration of the vehicle. Thus, a current position may be displayed to the user that is an estimate of the current position based on the last map matched current position, taking into account the amount by which the current position may have advanced since the position data sample was received for map matching.

The map matching algorithm proposes a unique path propagation step to isolate the curve-to-curve matching and the path scoring into two modules. Unlike most of the existing approaches which take the matching discrepancy as score directly, the algorithm treats partial discrepancy as either the map error due to the centreline simplification or the positioning input bias due to drift, which are further eliminated from the path scoring for the best path selection. This procedure allows the algorithm to work with low quality map, and allow also reliable matching in the GNSS-denied environment such as tunnels when one has to rely only on the highly drifted dead reckoning data. The manner in which the map matching algorithm is arranged to treat matching discrepancy and to maintain road connectivity in different situations enable the integrity of its usage in all transport environments.

Various steps/modules of the map matcher shown in FIG. 2 will now be described in more detail.

Path Candidate Pool Based on Road Topology

Initial Path Selection

When the map matcher switches into path matching mode, new initial paths must be constructed based on the best arc candidates. Path candidates are initialized as individual road segments, which are close enough to the first positioning input sample in both distance and heading. For example, road segments that are bounded by the input accuracy in an enclosing rectangle around the first positioning input sample may be chosen as the initial path candidates. Initial paths may, for example, be built for road segments that are aligned with the current heading and/or that are a short distance away. Choosing paths that are aligned with the current heading may account for cases where the input position is wrong but heading is correct, e.g. if the map matcher was reset during driving. Where the heading is unreliable, it is most likely that the user is on a nearby road. Furthermore, it is not practical to select and process too many road segments. The initial paths may be assigned a cost in terms of their differences in position and heading in order to rank the initial paths. Thus, a pool of candidate paths is generated.

Path Expansion

As new positioning data samples are received, the paths within the pool are expanded forward from the paths heads to connected road segments. In this way, the candidate paths naturally reflect the topology of the road, as the paths comprise a number of connected road segments.

Whenever an intersection is reached, the path candidate is copied so that the different expansions with the newly added road segments can be accommodated. The copied paths are treated independently by the rest of the algorithm. The new segments can be called "child segments", while the previous segments before the branching point are the common ancestors of all the branching paths.

To avoid the number of path candidates growing exponentially, the path expansion for each candidate is only triggered when the previously best matched location on that path is close to the path head and the new input can be potentially matched beyond the path. Paths are never expanded backward, along the same road segments where they arrive from. Paths are also not expanded in the direction against traffic flow to clearly forbidden roads, such as highways. However, expansion against the direction of traffic on normal one-way roads cannot be avoided.

Candidate Management

Candidate management is employed to reduce the path candidate pool size whilst preserving well-matching candidates. Reducing the candidate pool size is done in two ways: aggressively pruning the unused path tail on each path to make the path shorter as the positioning epoch progresses; and discarding incorrect paths from the candidate pool. Paths are tracked independently. A less likely path might ultimately turn out to be the correct one. Discarding incorrect paths should therefore be conservative to avoid mistakes. The algorithm evaluates several properties to discard paths. The first one is to evaluate the offset from the positioning input to the matched location. If this distance becomes larger than multiple times the input horizontal accuracy, the path is discarded. If the accuracy is not used correctly, drift caused by a dead-reckoning positioning solution may cause paths to be incorrectly discarded. Secondly, paths with bad score ratios relative to the greatest score are discarded. The algorithm uses the score ratio instead of the score itself as absolute scores vary in different scenarios. For example, bad scores appear in deep urban canyons with GNSS signal blockage, while good scores occur on highways with an open sky. Thirdly, it is crucial to keep all paths unique, in the sense that any two paths, by looking backwards for a certain distance, do not overlap exactly. Paths that overlap with a higher ranking path will be discarded. Overlap situations usually occur when paths are expanded through a branch, and later merge in a following intersection.

Figure 3:
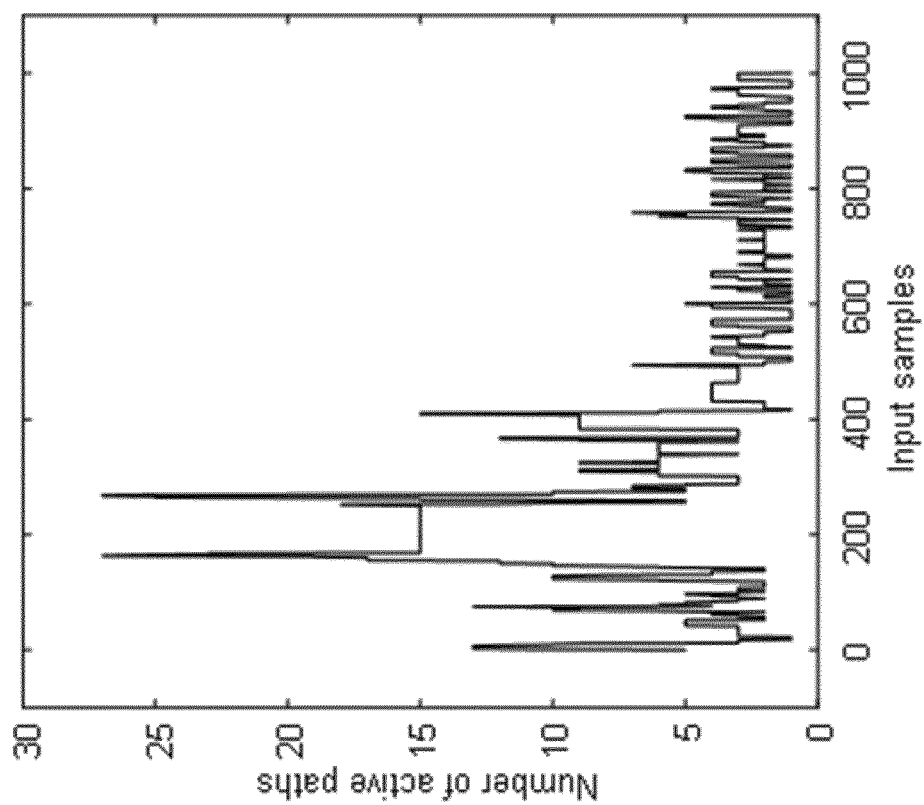
FIG. 3 shows the results of map matching in an Amsterdam urban canyon (left panel) and the number of active paths maintained along the trip (right panel)
Figure 3:
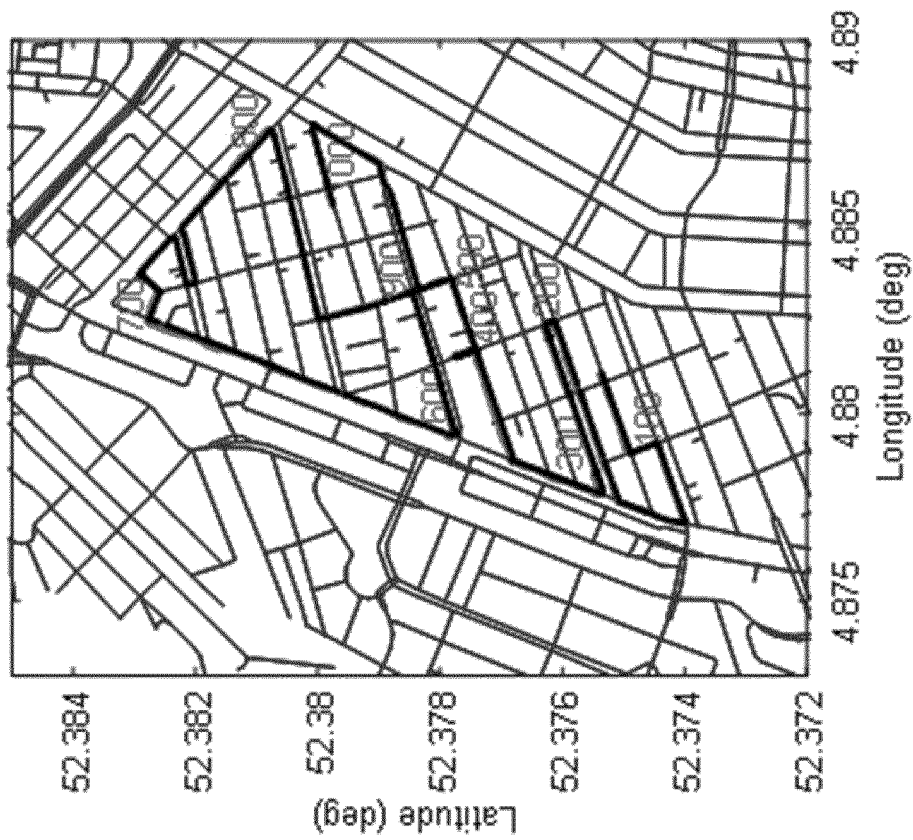

All thresholds of discarding paths should also be adaptive in various scenarios, in order to always keep the candidate size within a feasibly computational region for the real-time mass-market devices. FIG. 3 illustrates an example of the path size change when a car drives in a dense urban canyon in Amsterdam. As shown, the algorithm has a great control on the candidate size thanks to the proper candidate management strategy and the proper path expansion.

Maintain Road Connectivity in Special situations

U-Turn Detection and Handling

If a U-turn is detected, it is better to maintain the road connectivity rather than restart map matching from scratch. U-turns are processed early in the map matching process in the input processing layer 100 by a dedicated module 104. A U-turn is detected when the input trace is determined to be a U-turn shape. After the U-turn is detected, new paths with opposite directions should be constructed and added to the candidate pool. However, the original paths are not discarded, and the map matching treats both groups of candidates equally. This assures that the map matching can work continuously in special road shapes such as hairpin turns or roundabouts, or if special input trace has been mistaken as a U-turn. The map matcher runs on all candidates and ranks them based on the scores. The poor matching paths (which may be the U-turn path, or e.g. the hairpin path) will be determined by the map matcher and eventually discarded. Thus, if one of the original paths is in fact a better match than the newly constructed paths, the map matched is able to continue matching to it without disturbance. This relies on the separation of the detection of the U-turn in the input processing layer 100 and the handling of the U-turn in the map matching algorithm layer 200.

Where multiple U-turns occur on the same path, it may be necessary to filter overlapped paths where e.g. constructed opposite paths are overlapping with the original ones. After the first U-turn, opposite paths can be constructed without overlapping with the original paths; while after the second U-turn, opposite paths of the opposite paths may be the same as the original paths, in which case these may be deleted based on ranking.

Tunnel Detection and Handling

Figure 4:
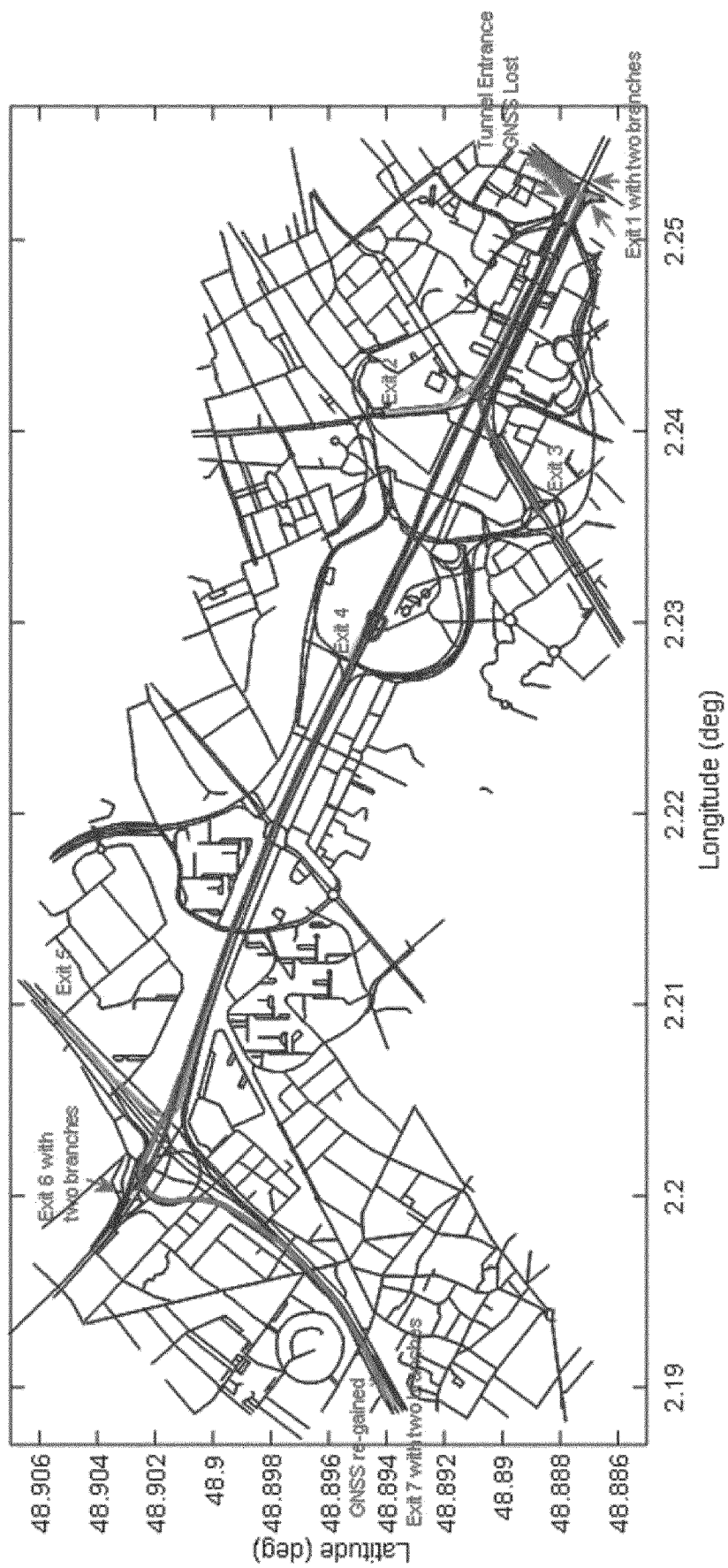
FIG. 4 illustrates a path expansion through a tunnel during a GNSS outage.

Tunnels are another special situation as GNSS signals are generally completely blocked and new GNSS data is only received at the exit of the tunnel. The map matching algorithm described herein is capable of maintaining the road connectivity until the new GNSS fixes are received. Whenever there is a GNSS outage, it is possible to follow the tunnels attributes in the map, and expand only tunnel paths that reach tunnel exits. In this way, the path expansion is correctly prepared for the first re-gained GNSS fix, which can then be captured at the tunnel exit and continually matched to the path. FIG. 4 illustrates this situation taking Paris tunnels as an example. Paths are expanded towards all tunnel exits during the GNSS outage and waiting for the first re-gained GNSS fix.

Tunnel entrance detection, which is applicable to GNSS-only, may involve two steps: searching a certain distance in front for tunnels, based on the map data, and setting a flag for each path; and checking whether there is a big input jump in their timestamp (e.g. >10 s). If the segment has been flagged as a tunnel, and there is a big input jump, then a tunnel is detected. A smaller jump (<10 s) may correspond to a small tunnel, but as long as the path expansion covers this small time gap, it is not necessary to perform and special handling for this tunnel.

There is generally no input data inside a tunnel. In such cases, during the period waiting for the GNSS fix to be re-gained (GNSS outage period), the paths are expanded (in a first path expansion) towards the tunnel exits in order to keep the path matrix for when the GNSS fix is re-gained. This path expansion stops at the tunnel exits. Once the first GNSS fix is obtained at a tunnel exit, tunnel exits that are too far away from the new input position can be discarded. Because the new input position may still be far away from the tunnel exits, the paths are then expanded for a second time.

Reverse Driving Detection and Handling

Reverse driving detection is performed by reverse driving check module 103 in the input processing layer 100. There is no reverse driving detection on GNSS. However, automotive dead reckoning positioning would give a negative distance travelled as input if driving in reverse, allowing reverse driving to be detected.

The map matcher should still run forward when driving in reverse direction. So, the input heading should be flipped before the map matching algorithm, and the map matching result should be flipped back afterwards. The prediction path builder should reverse the path to the opposite path after the map matching.

The pool of candidate paths is replaced with a set of paths in the reverse direction when a reverse driving situation is directed. The new set of paths is constructed in the following manner; first, with each of one of the existing set of candidate paths in the forward, first driving direction being expanded a predetermined distance, e.g. d metres, in the forward, first driving direction. The current map matched position on the candidate path is then artificially moved forward by this predetermined distance, e.g. said d metres, in the forward, first driving direction. This step is performed so as to avoid missing any intersections in front of the current position before creating the set of reverse paths. The segment is identified on which the artificially advanced current map matched position now lies, and the segment is reversed to form the initial part of a new candidate path in the opposite, second driving direction. This initial part of the new candidate path in the opposite driving direction is now expanded to create an expanded candidate path in the opposite, second driving direction. The expansion is carried out in the same manner to that described in relation to obtaining the pool of candidate paths in the forward driving direction herein, except typically without the use of certain restrictions, such as one-way streets (since it is assumed one event where reverse driving is necessary is that a driver has mistakenly entered a one-way street in the wrong direction). Once the expanded candidate path in the reverse driving direction has been created, the map matched current position is returned to its real position with respect to the new candidate paths, i.e. by moving the position forwards on the reverse paths by the predetermined distance, e.g. said d metres. Accordingly, for a segment on each of the new candidate paths, there is a possible position corresponding to the map matched current position, and using which the subsequent map matching is performed.

Input Jump Check

The purpose of the input jump check, which is implemented in the input jump check module 101 on the input processing layer 100 is to determine whether a current position has jumped far outside of existing path reachability. In this case, old paths may need to be discarded and replaced with new paths. As the jump may be due to an input outlier (e.g. an error in GNSS data), the algorithm is arranged to not reset on the first sample.

Stationary Check

The stationary check is implemented in the stationary check module 102 and serves to detect whether there is a standstill condition. If it detected that there is no movement, then the map matcher algorithm need not be run.

Off-Road Check

The off-road check is implemented in post-processing by off-road check module 290.

This function compares the current input position with the best matching position determined by the map matching algorithm. Where the difference between the distance from the current position to the projection on the best path is too great, the map matcher goes off-road. Similarly, where the difference between the heading of the current position and the direction on the best path is too great, and the distance additionally exceeds a heading-adjusted distance threshold, the map matcher goes offline. Also, where the best path reaches a dead-end, the map matcher may go offline. Generally, so long as the speed is high enough, the map matcher will not go offline when travelling on a highway.

When the map matcher goes offline, it may switch to an arc matching mode where it looks for well-matching arcs. Once a well-matching arc is found, the map matcher may then switch back to path matching mode, and construct initial path candidates, etc. as described above.

Path Propagation

During the map matching update, each matcher on each candidate path is first propagated forward with the new positioning input, producing an estimate of the correct place along the paths, where the input is expected to match to. This can be considered as a special case of a particle filter: the map matcher looks for one best position along each path.

In the position matcher 231, due to the fact that both the digital map and the input trace can have shifts, it is impossible to always obtain a correct curve-to-curve match between the input trace and the path without compensating the shift. The best matched position along the path should be defined as the position that minimizes the curve dissimilarity after enumerating all possible shifts. However, the curve dissimilarity, represented by score, is expansive to calculate. A compromise is thus made in the map matching algorithm to propagate the shift in the path propagation module before scoring. The initial shift is the simply assumed as the cross-track offset between the first input sample and the path curve. As inputs progress, the input trace is adjusted by the previous offset before calculating the new cross-track error, which is then used to update a new offset. Therefore, the offset is accumulated epoch by epoch, which is computationally efficient. However, it is found that a cross-track offset before a turn becomes as an along-track error after the turn, which is difficult to compensate back, as the best position along the path is the one that is always perpendicularly projected to the path. Offset optimization is thus proposed. It backward propagates the translated input trace along the path and (weighted) averages the obtained variety of offsets for an offset correction. Offset optimization guarantees a better shape-based match to the path, while it is relatively expansive and only runs in certain conditions, e.g. after turns.

Like the position matcher 231, the heading matcher 232 also processes two dimensional data, consisting of accumulated travelled distance and heading. The map road geometry is represented by the accumulated path length and the road segment heading. The accumulated distance along the path often differs from the true distance driven, due to the simplified map and the absence of the road wide information. For example, a corner constituted by several successive road segments is usually longer than the actual distance that a driver will travel, while changing lanes along a wide straight road results in a longer input distance travelled than the road segment accumulation. This can be compensated in the heading matcher path propagation by adjusting the input distance travelled by an offset. Offset optimization is also implemented to minimize the discrepancy of two turning functions, and also to prevent the heading matcher 232 from skipping over problematic turns along the path when the distance travelled increases.

Path propagation is the module that not only optimizes the offset, but also produces the estimate of a correct matched location. Other matchers such as speed-limit matcher 252 and distance travelled matcher 251, who take only one dimension data as inputs, can skip path propagation step, as they rely on the resultant matched location.

Figure 5:
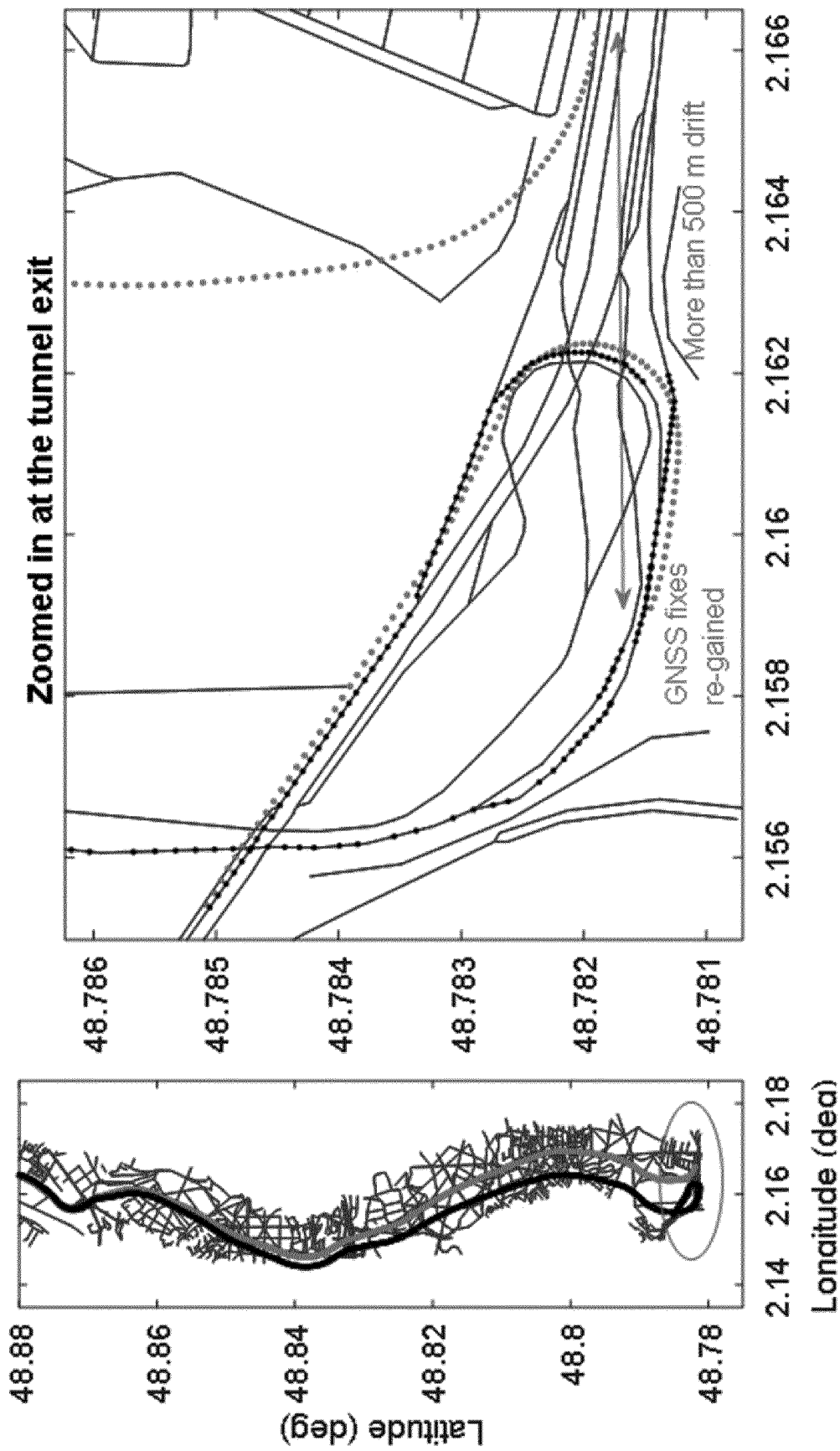
FIG. 5 illustrates map matching from the drifted DR positioning trace to the tunnel path.

Input translation and propagation along the path are essential to assure a valid matching with a big drift. For example, during the GNSS outage in tunnels, a dead-reckoning positioning system would still be able to provide positioning data, but it will drift from the true trajectory due to the accumulated gyro drift and accelerometer bias. FIG. 5 depicts a tunnel case in Paris using the drifted dead reckoning positioning. As can be seen, the input trace close to the tunnel exit drifted more than 500 meters, while is still well matched to the correct path. Although there is a wrong jump to the parallel road before the re-gained GNSS fixes and there is a wrong choose for a couple of samples after a bifurcation after the GNSS fixes, the algorithm achieves successful matching to the tunnel without involving any feedback loop between the positioning component and the map matching component.

Path Scoring and Multi-Matcher Fusion

Position matcher 231 utilizes the summed norm as the score, while the heading matcher 232 treats the area of the summed-up rectangles between two tuning functions as score. They are relatively simple ways to quantitatively measure the geometric displacement and representative curve dissimilarity, respectively, between the translated input trace and the actual path. Other matchers such as the distance travelled matcher 251 and the speed-limit matcher 252 are based on the resultant best matched location after the path propagation to further confirm or deny the result on each path. As more measures are involved in the matching process, a belief theory based multi-criteria fusion is used in the algorithm, independently for each path, to distinguish the conflict between different criteria and to estimate the likelihood that the path is the correct path. Belief theory, also called Dempster-Shafer theory, may suitably be used because it can work even if the source of the belief values is not completely defined. Meanwhile, the Dempster combination rule is purely a cumulative operation, which makes it easy to expand and computationally inexpensive. However, various other suitable probability theories such as hidden Markov chain, fuzzy logic and Kalman filter may also be used.

Path Ranking and Decision Making

Path ranking and decision making are in the end of map matching for a selection of the best matched path among all path candidates. Due to the separation of the path propagation and the path scoring, the information used to select the best path includes both the offset and the belief likelihood. They are in two different matching domains. Likelihood is a quantitative index between 0 and 1 to represent the curve-to-curve shape displacement, while the offset is the vector to shift the input trace and therefore represents the input or map bias. Neither of them is truly reliable. For example, likelihood does not distinguish two parallel roads as they have the same geometric shape and equally match the input trace. In this case, offset will play an important role. On the contrary, offset cannot solely judge the match either. In the dead reckoning tunnel case, the offset will continually increase due to the dead reckoning drift, where one has to rely on the shape based likelihood.

Path ranking merges these two matching domains in a layered design. It firstly classifies all path candidates into two groups based on the offset, then continue to sub-classify the group with a better offset into sub-groups based on the likelihood. Within each group, paths are further ranked in the descend order by the likelihood. Ranking produces the best matched path for the current input. However, it does not prevent jumping between paths when the best matched path varies from one sample to the next. Decision maker is then used to minimize jumps, which compares the current best ranked path against the previous best for a decision either to jump to the new best or to stick to the previous.

Unlike most of the existing approaches which take the curve-to-curve matching discrepancy as score directly, this algorithm treats partial discrepancy as either the map error due to the centerline simplification or the positioning input bias due to drift, which are further eliminated from the path scoring for the best path selection, resulting in a better shape matching. The algorithm also makes use of full input information such as position, heading, distance travelled and speed limit as multi-criteria in the path scoring, leading to a more reliable performance. The algorithm has a good balance between the matching accuracy and the computational speed, suitable to use in the mass-market navigation devices.

Jump Detection

A jump is where the path chosen as the most probable candidate changes to a different path from the last sample. Two paths are of interest in jump detection: the "best" path after ranking, which is the path that may be jumped to; and the "preferred" path, which is the best path of the previous run of the map matcher algorithm, which is the path that may be jumped from.

The jump detection algorithm tries to minimise or delay jumps, so as to avoid jumping too early and having to jump back again. For instance, the algorithm may stick to the preferred path after receiving new positioning input at a tunnel exit, as this input may be noisy, and may not be accurate. Generally, the algorithm may choose to stick to the preferred path where the probability of the best path is lower than the probability of the preferred path, or where the mass distance of the best path exceeds the mass distance of the preferred path, or where a real jump has occurred in the near history. In this way, a jump will only be made when the algorithm has determined that it is appropriate.

Although embodiments of the present invention are described with reference to a car user (or driver) traversing a route defined by one or more road segments, it should be realised that the techniques described herein may also be applied to various other navigable segments, such as segments of a path, river, canal, cycle path, tow path, railway line, or the like. Thus, the user need not be a driver of a car, but may also be, for example, a pedestrian or cyclist receiving navigational instructions.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of matching a current position of a device to an electronic map indicative of a network of navigable elements within a geographic area, the electronic map comprising a plurality of segments representative of the navigable elements, the method comprising:
   obtaining positional data indicative of the movement of the device, the positional data comprising a plurality of position data samples indicative of the position of the device at different times;
   obtaining electronic map data in respect of at least a portion of the area covered by the electronic map; and
   maintaining a pool of candidate paths with respect to the electronic map, each candidate path being a possible path through the electronic map to which the current position of the device may be matched, each candidate path comprising one or more segments of the electronic map, wherein said maintaining further comprises updating the pool of candidate paths by expanding one or more of the candidate paths to provide an expanded candidate path including at least a segment connected to the segment providing a head end of the original candidate path,
   wherein the method further comprises:
   identifying a candidate path from the pool which provides the best match to the positional data, based on a plurality of said position data samples;
   using the identified candidate path in obtaining an estimated current position of the device with respect to a segment of the electronic map for output as the map matched current position; and
   generating data indicative of the map matched current position.

2. The method of claim 1, wherein the position data samples are time stamped position data samples.

3. The method of claim 1, wherein the step of expanding a candidate path is triggered when the most recent map matched position of the device is in proximity to the head end of the path.

4. The method of claim 1, comprising actively managing the pool of candidate paths, optionally by discarding paths and/or reducing the length of candidate paths.

5. The method of claim 1, comprising matching the positional data to each one of a plurality of the candidate paths of the candidate path pool based on a plurality of the position data samples, wherein the matching process is carried out independently for each candidate path.

6. The method of claim 1, comprising, for each candidate path considered, matching the positional data to the candidate path according to each of a plurality of matching criteria, wherein the matching in respect of each criteria is carried out independently.

7. The method of claim 6, wherein the matching in respect of each criteria is carried out by an independent matching engine.

8. The method of claim 6, wherein the method comprises providing, for each candidate path considered, a score indicative of the extent to which the positional data matches the candidate path, and ranking the candidate paths based at least on their respective scores.

9. The method of claim 8, wherein, for each candidate path, a respective score indicative of the extent to which the positional data matches the candidate path is obtained for each one of the matching criteria, and the method comprises combining each score to provide an overall matching score for the candidate path.

10. The method of claim 9, wherein the step of combining each score is carried out using a technique based on belief theory.

11. The method of claim 8, wherein the identification of the candidate path providing the best match is based on the respective matching score for the candidate path and an offset between the positional data trace and the candidate path for each candidate path considered.

12. The method of claim 6, wherein the criteria include at least heading and position.

13. The method of claim 6, wherein the matching in relation to each of the criteria for a candidate path comprises the step of identifying a point on the candidate path that provides the best estimate as to the current position of the device; optionally further comprising choosing the estimated current position for output from among the estimated current position of the device on the best matching candidate path, and the estimated current position on one or more candidate paths connected thereto.

14. The method of claim 1, further comprising inputting the generated data indicative of a map matched current position to a prediction engine for use in generating data indicative of one or more predicted updated position of the device, and using the predicted updated position data provided by the prediction engine in displaying an indication of the position of the moving device on an electronic map.

15. A method of matching a current position of a device to an electronic map indicative of a network of navigable elements, the electronic map comprising a plurality of segments representative of the navigable elements, the method comprising:
obtaining positional data indicative of the movement of the device, the positional data comprising a plurality of position data samples indicative of the position of the device at different times;
obtaining electronic map data in respect of at least a portion of the area covered by the electronic map; and
maintaining a pool of candidate paths with respect to the electronic map, each candidate path being a possible path through the electronic map to which the current position of the device may be matched, each candidate path comprising one or more segments of the electronic map, wherein said maintaining further comprises, upon detecting that the current position is in, or approaching a tunnel, updating the pool of candidate paths by expanding one or more of the candidate paths to provide an expanded candidate path including at least a segment connected to the segment providing a head end of the original candidate path, wherein the segment is a segment that leads to an exit of the tunnel,
wherein the method further comprises:
identifying a candidate path from the pool which provides the best match to the positional data, based on a plurality of said position data samples;
using the identified candidate path in obtaining an estimated current position of the device with respect to a segment of the electronic map for output as the map matched current position; and
generating data indicative of the map matched current position.

16. A map matching engine comprising one or more processors and a memory for storing an electronic map indicative of a navigable network, the electronic map comprising a plurality of nodes connected by segments representative of the navigable elements, the one or more processors being arranged to perform a method for matching a current position of a device to the electronic map, the method comprising:
obtaining positional data indicative of the movement of the device, the positional data comprising a plurality of position data samples indicative of the position of the device at different times;
obtaining electronic map data in respect of at least a portion of the area covered by the electronic map; and
maintaining a pool of candidate paths with respect to the electronic map, each candidate path being a possible path through the electronic map to which the current position of the device may be matched, each candidate path comprising one or more segments of the electronic map, wherein said maintaining further comprises updating the pool of candidate paths by expanding one or more of the candidate paths to provide an expanded candidate path including at least a segment connected to the segment providing a head end of the original candidate path,
wherein the method further comprises:
identifying a candidate path from the pool which provides the best match to the positional data, based on a plurality of said position data samples;
using the identified candidate path in obtaining an estimated current position of the device with respect to a segment of the electronic map for output as the map matched current position; and
generating data indicative of the map matched current position.

17. The map matching engine of claim 16, wherein the engine is provided by a server and/or a navigation device.

18. A map matching engine comprising one or more processors configured to perform a method for matching a current position of a device to an electronic map indicative of a network of navigable elements, the electronic map comprising a plurality of segments representative of the navigable elements, the method comprising:
obtaining positional data indicative of the movement of the device, the positional data comprising a plurality of position data samples indicative of the position of the device at different times;
obtaining electronic map data in respect of at least a portion of the area covered by the electronic map;
maintaining a pool of candidate paths with respect to the electronic map, each candidate path being a possible path through the electronic map to which the current position of the device may be matched, each candidate path comprising one or more segments of the electronic map, wherein said maintaining further comprises, upon detecting that the current position is in, or approaching a tunnel, updating the pool of candidate paths by expanding one or more of the candidate paths to provide an expanded candidate path including at least a segment connected to the segment providing a head end of the original candidate path, wherein the segment is a segment that leads to an exit of the tunnel;
identifying a candidate path from the pool which provides the best match to the positional data, based on a plurality of said position data samples;
using the identified candidate path in obtaining an estimated current position of the device with respect to a segment of the electronic map for output as the map matched current position; and
generating data indicative of the map matched current position.

19. A non-transitory computer readable storage medium storing instructions that, when executed by one or more processors in a system that stores an electronic map indicative of a navigable network, the electronic map comprising a plurality of nodes connected by segments representative of the navigable elements, cause the one or more processors to perform a method for matching a current position of a device to the electronic map, the method comprising:
obtaining positional data indicative of the movement of the device, the positional data comprising a plurality of position data samples indicative of the position of the device at different times;
obtaining electronic map data in respect of at least a portion of the area covered by the electronic map;
maintaining a pool of candidate paths with respect to the electronic map, each candidate path being a possible path through the electronic map to which the current position of the device may be matched, each candidate path comprising one or more segments of the electronic map, wherein said maintaining further comprises updating the pool of candidate paths by expanding one or more of the candidate paths to provide an expanded candidate path including at least a segment connected to the segment providing a head end of the original candidate path;

identifying a candidate path from the pool which provides the best match to the positional data, based on a plurality of said position data samples;

using the identified candidate path in obtaining an estimated current position of the device with respect to a segment of the electronic map for output as the map matched current position; and generating data indicative of the map matched current position.

20. A non-transitory computer readable storage medium storing instructions that, when executed by one or more processors, cause the one or more processors to perform a method for matching a current position of a device to an electronic map indicative of a network of navigable elements, the electronic map comprising a plurality of segments representative of the navigable elements, the method comprising:

obtaining positional data indicative of the movement of the device, the positional data comprising a plurality of position data samples indicative of the position of the device at different times;

obtaining electronic map data in respect of at least a portion of the area covered by the electronic map;

maintaining a pool of candidate paths with respect to the electronic map, each candidate path being a possible path through the electronic map to which the current position of the device may be matched, each candidate path comprising one or more segments of the electronic map, wherein said maintaining further comprises, upon detecting that the current position is in, or approaching a tunnel, updating the pool of candidate paths by expanding one or more of the candidate paths to provide an expanded candidate path including at least a segment connected to the segment providing a head end of the original candidate path, wherein the segment is a segment that leads to an exit of the tunnel;

identifying a candidate path from the pool which provides the best match to the positional data, based on a plurality of said position data samples;

using the identified candidate path in obtaining an estimated current position of the device with respect to a segment of the electronic map for output as the map matched current position; and generating data indicative of the map matched current position.

* * * * *